US011204471B2

(12) United States Patent
Holmquist

(10) Patent No.: US 11,204,471 B2
(45) Date of Patent: Dec. 21, 2021

(54) CONDUCTIVE HEATING ASSEMBLY FOR RAPID PROCESSING OF FIBER OPTIC CONNECTORS; AND METHODS

(71) Applicant: COMMSCOPE TECHNOLOGIES LLC, Hickory, NC (US)

(72) Inventor: Marlon E. Holmquist, St. Peter, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/651,758

(22) PCT Filed: Sep. 28, 2018

(86) PCT No.: PCT/US2018/053335
§ 371 (c)(1),
(2) Date: Mar. 27, 2020

(87) PCT Pub. No.: WO2019/067850
PCT Pub. Date: Apr. 4, 2019

(65) Prior Publication Data
US 2020/0257061 A1    Aug. 13, 2020

Related U.S. Application Data

(60) Provisional application No. 62/565,667, filed on Sep. 29, 2017.

(51) Int. Cl.
*G02B 6/38* (2006.01)
*B29C 65/20* (2006.01)
*B29C 65/48* (2006.01)

(52) U.S. Cl.
CPC ............ *G02B 6/3861* (2013.01); *B29C 65/20* (2013.01); *B29C 65/4815* (2013.01); *G02B 6/3893* (2013.01)

(58) Field of Classification Search
CPC ............... G02B 6/2552; G02B 6/3861; B29C 35/0288; B29C 35/0294
See application file for complete search history.

(56) References Cited

U.S. PATENT DOCUMENTS 3,880,970 A * 4/1975 Dinzburg ............ B29D 35/122
264/54
4,695,124 A * 9/1987 Himono ............... G02B 6/3857
385/78

(Continued)

FOREIGN PATENT DOCUMENTS

CN    104428705 A    3/2015
GB    2 237 125 A    4/1991

(Continued)

OTHER PUBLICATIONS

International Search Report and Written Opinion of the International Searching Authority for International Patent Application No. PCT/US2018/053335 dated Jan. 31, 2019, 7 pages.

(Continued)

*Primary Examiner* — Scott W Dodds
(74) *Attorney, Agent, or Firm* — Merchant & Gould P.C.

(57) ABSTRACT

Aspects and techniques of the present disclosure relates to a conductive assembly that provides faster cure times of adhesives used to assemble fiber optic connectors than normal convection ovens. The present disclosure also relates to a design of a fiber optic connector that allows for a rapid polishing process. The present disclosure further relates to a method for anchoring an optical fiber in a connector of the kind described, where the cure time is faster than convection ovens.

9 Claims, 24 Drawing Sheets

(56) References Cited

U.S. PATENT DOCUMENTS

| | | | |
|---|---|---|---|
| 4,713,523 A | 12/1987 | MacDonald | |
| 5,080,582 A | 1/1992 | Salzberg | |
| 5,123,276 A * | 6/1992 | Hartman | G01N 1/405 |
| | | | 73/23.41 |
| 5,770,132 A | 6/1998 | Yamamura et al. | |
| 5,971,629 A * | 10/1999 | Bloom | G02B 6/2551 |
| | | | 385/94 |
| 6,281,476 B1 | 8/2001 | Voizey | |
| 6,491,444 B1 | 12/2002 | Greub et al. | |
| 6,554,488 B2 | 4/2003 | Asada | |
| 7,044,651 B2 | 5/2006 | Satoh et al. | |
| 9,039,294 B2 | 5/2015 | Seng | |
| 9,195,006 B1 | 11/2015 | Hoener et al. | |
| 9,417,397 B2 | 8/2016 | Kobyakov et al. | |
| 2002/0094174 A1 | 7/2002 | Asada | |
| 2004/0047567 A1 | 3/2004 | Gimbel et al. | |
| 2004/0057674 A1 | 3/2004 | Satoh et al. | |
| 2016/0077290 A1 | 3/2016 | Beebe | |
| 2016/0097905 A1 | 4/2016 | Nicholson | |
| 2016/0349461 A1 | 12/2016 | Kobyakov et al. | |

FOREIGN PATENT DOCUMENTS

| | | |
|---|---|---|
| JP | S56-18908 U | 2/1981 |
| JP | S57-186719 A | 11/1982 |
| JP | H08-43665 A | 2/1996 |
| TW | 353146 B | 2/1999 |
| WO | 2017/087849 A1 | 5/2017 |

OTHER PUBLICATIONS

First Chinese Office Action for Chinese Patent Application No. 201880060423.9 dated Jun. 7, 2021, 6 pages.

Extended European Search Report for European Patent Application No. 18860671.9 dated Jun. 9, 2021, 8 pages.

* cited by examiner

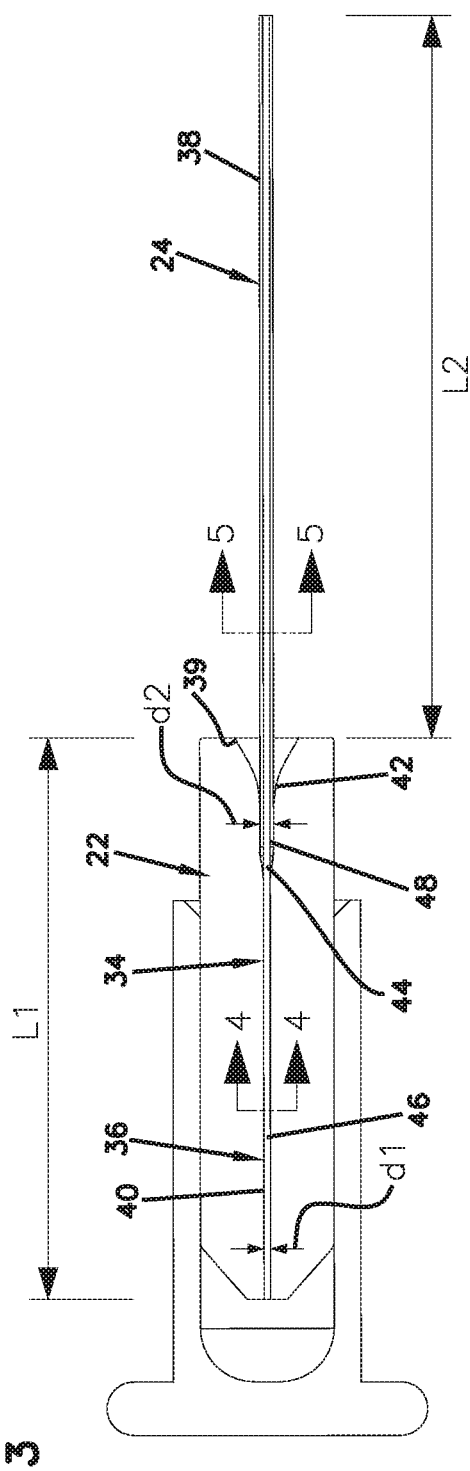
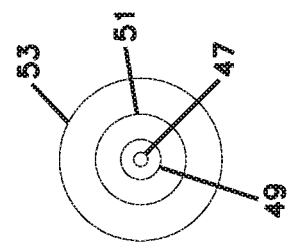
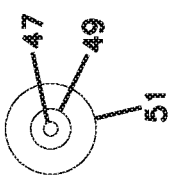

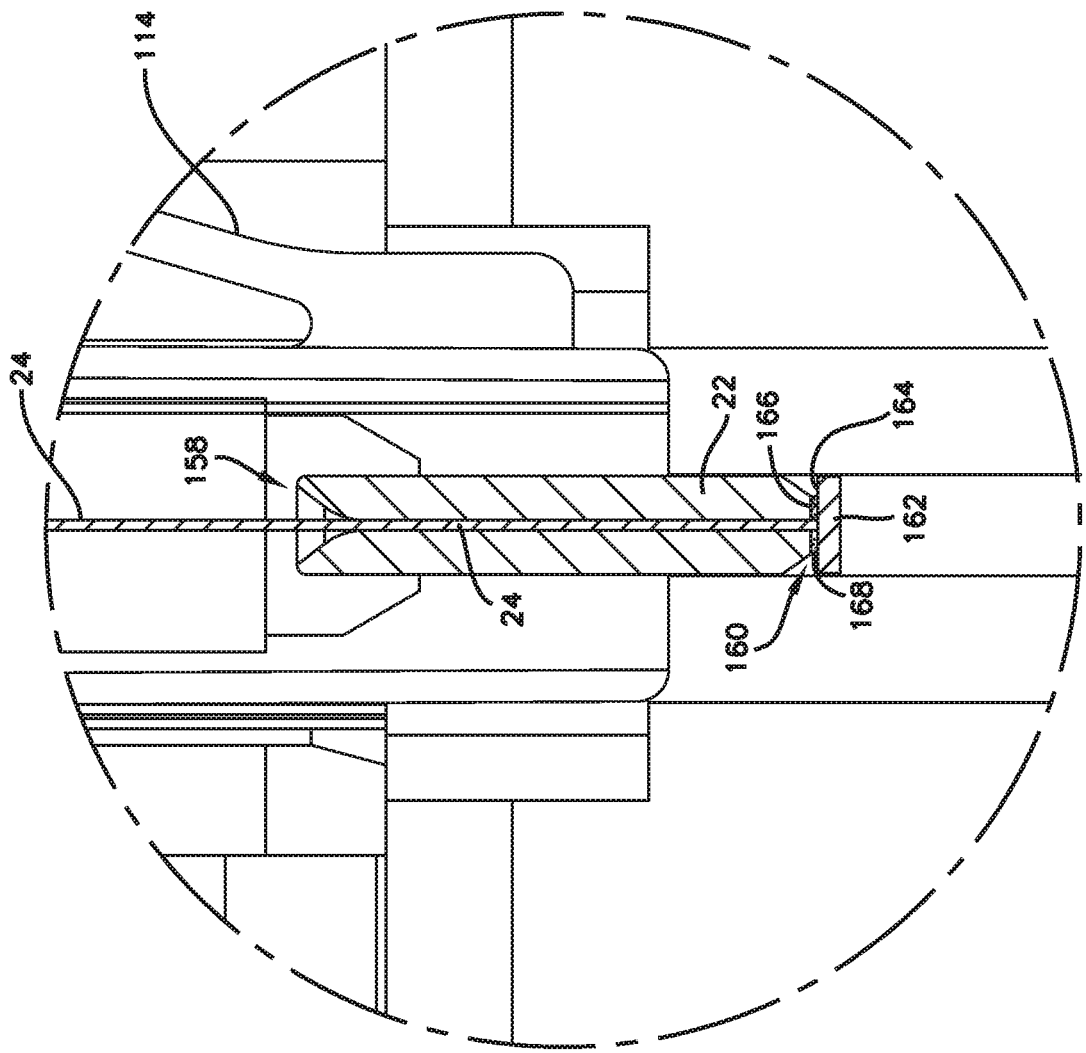

CONDUCTIVE HEATING ASSEMBLY FOR RAPID PROCESSING OF FIBER OPTIC CONNECTORS; AND METHODS

CROSS-REFERENCE TO RELATED APPLICATION

This application is a National Stage Application of PCT/US2018/053335, filed on Sep. 28, 2018, which claims the benefit of U.S. Patent Application Ser. No. 62/565,667, filed on Sep. 29, 2017, the disclosures of which are incorporated herein by reference in their entireties. To the extent appropriate, a claim of priority is made to each of the above disclosed applications.

TECHNICAL FIELD

The present disclosure relates generally to fiber optic connectors. More particularly, the present disclosure relates to an assembly and method for processing ferrules and corresponding optical fibers used in fiber optic connectors.

BACKGROUND

Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. The ferrule assembly includes a ferrule and a hub mounted to a rear end of the ferrule. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of a fiber optic adapter that receives the connectors, aligns the ferrules and mechanically holds the connectors in a connected orientation relative to one another.

A fiber optic connector is often secured to the end of a corresponding fiber optic cable by anchoring strength structures of the cable to the connector housing of the connector. Anchoring is typically accomplished through the use of conventional techniques such as crimps or adhesive. In a direct termination process, the connector is installed on the fiber optic cable by securing an end portion of an optical fiber of the fiber optic cable within a ferrule of the connector. An epoxy resin adhesive can be loaded into a syringe and injected into the connector. To cure the epoxy resin adhesive, the connector can be inserted into an oven, followed by scoring and breaking off the fiber and polishing until the end of the fiber and the cured epoxy resin adhesive are flush with an end face of the connector to provide an acceptable optical interface at the end of the optical fiber.

Improvements are needed to reduce the time and cost of assembling fiber optic connectors.

SUMMARY

One aspect of the present disclosure relates to a conductive assembly that provides faster cure times of adhesives used to assemble fiber optic connectors than normal convection ovens. The present disclosure also relates to a design of a fiber optic connector that allows for a rapid polishing process.

Another aspect of the present disclosure relates to a method for anchoring an optical fiber in a connector of the kind described, where the cure time is faster than convection ovens.

Another aspect of the present disclosure relates to a conductive assembly for securing an optical fiber to a ferrule of a fiber optic connector. The conductive assembly can include a heater device having intermating first and second heating blocks. The first and second heating blocks can each have a ferrule mounting section that defines longitudinal slots with half-cylindrical interfaces. The first and second heating blocks can cooperate together such that the half-cylindrical interfaces of the longitudinal slots define a heating chamber adapted to receive a portion of the ferrule. Heat can be conducted via the first and second heating blocks directly to the portion of the ferrule mounted in the heating chamber to cure the adhesive therein.

A further aspect of the present disclosure relates to a method for securing an optical fiber to a ferrule connector. The method can include the steps of: (a) inserting a pre-loaded adhesive filled fiber optic connector into a conductive heater device containing a heating element; (b) exposing at least a portion of a ferrule of the fiber optic connector in direct thermal contact with the conductive heater device, the conductive heater device can include first and second heating blocks that each have a half-cylindrical interface with the portion of the ferrule for imparting conductive heating circumferentially thereabout; and (c) maintaining the ferrule in operative relationship with the heater device until curing of the adhesive has been achieved to secure an optical fiber within the ferrule.

Another aspect of the present disclosure relates to a method of manufacturing a fiber optic connector. The method can include a step of positioning a pad in relationship to the fiber optic connector such that the pad creates a resilient stop at an end face of a ferrule of the fiber optic connector. The method can include a step of injecting an adhesive into a ferrule bore of the ferrule of the fiber optic connector and inserting an optical fiber into the ferrule bore. After insertion of the optical fiber, a pre-cleaved fiber end of the optical fiber can protrude beyond an end face of the ferrule and can be precisely positioned by the pad. Insertion of the optical fiber displaces a volume of adhesive such that the volume of adhesive accumulates in a region of the end face of the ferrule and hits the pad and the pad spreads the volume of adhesive across the end face of the ferrule to create a thin film layer. After curing of the volume of adhesive, polishing the pre-cleaved fiber end and the end face of the ferrule where the polishing removes the thin film layer and levels the polished pre-cleaved fiber end with the end face of the ferrule.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 3 is a longitudinal cross-sectional view of the ferrule assembly of FIG. 1 with a dust cap installed on the ferrule;

FIG. 4 is a cross-sectional view taken along section line 4-4 of FIG. 3, the cross-sectional view shows a bare fiber portion of an optical fiber of the ferrule assembly;

FIG. 5 is a cross-sectional view taken along section line 5-5 of FIG. 3, the cross-section shows a coated fiber portion of the ferrule assembly;

FIG. 6 is a cross-sectional view showing an alternative configuration for the coated fiber portion of FIG. 5;

FIG. 28 is an enlarged cross-sectional view of a portion of the conductive assembly of FIG. 21 depicting a final state of a thin adhesive layer formed across the end face of the ferrule in accordance with the principles of the present disclosure.

DETAILED DESCRIPTION

As used herein, a "ferrule" is a relatively hard structure adapted to receive and support an optical fiber near the end or at the end of the optical fiber. A ferrule is typically adapted to assist in providing alignment of an optical fiber with a corresponding optical fiber of a mated fiber optic connector. In the case of single-fiber ferrules, such ferrules are often cylindrical and often have a construction made of ceramic or of relatively hard plastic. Examples of these types of ferrules can include SC ferrules and LC ferrules. Ferrules can also include multi-fiber ferrules that receive and support a plurality of optical fibers. An example multi-fiber ferrule can include an MPO ferrule.

As used herein, a bare fiber is a section of optical fiber that does not include any coating. Instead, the bare fiber includes a core surrounded by a cladding layer. The optical fiber is "bare" because the cladding layer is exposed and not covered by a supplemental coating layer such as acrylate.

Figure 1:
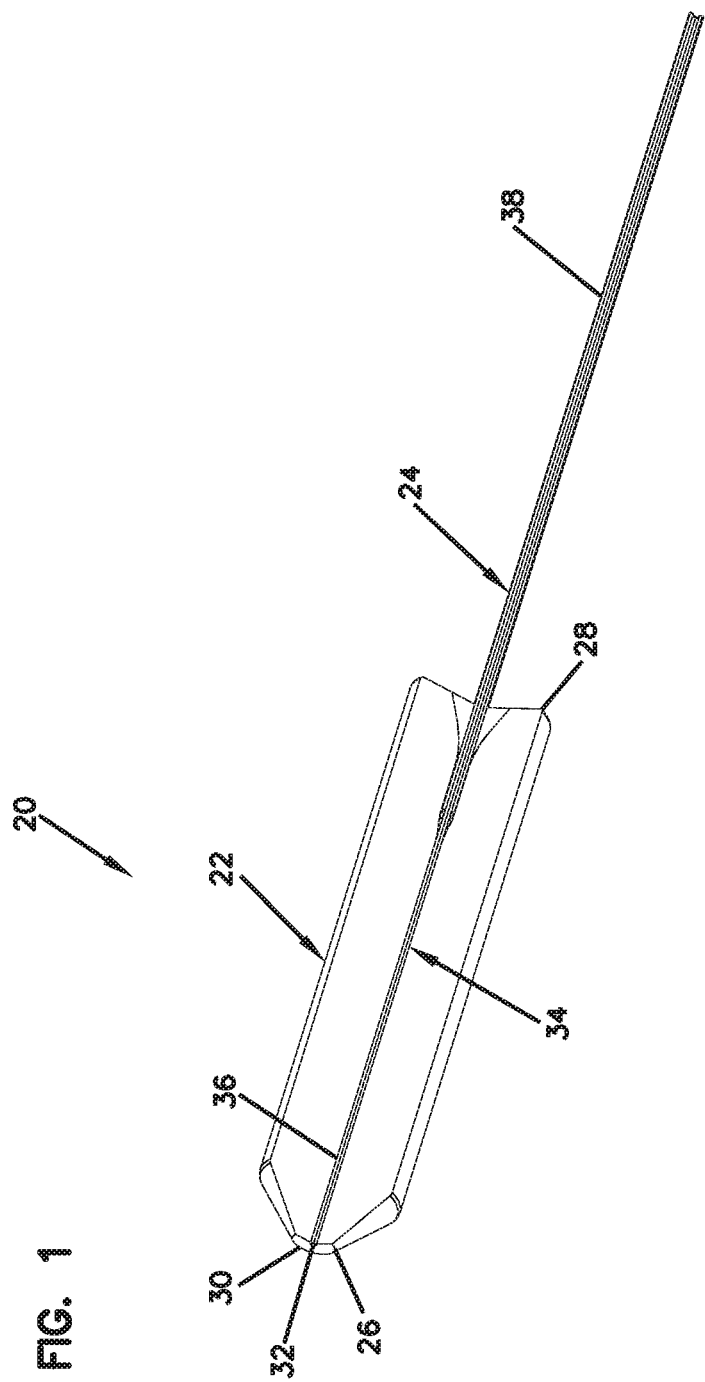
FIG. 1 is a front, perspective, cross-sectional view of a ferrule assembly in accordance with the principles of the present disclosure.
Figure 2:
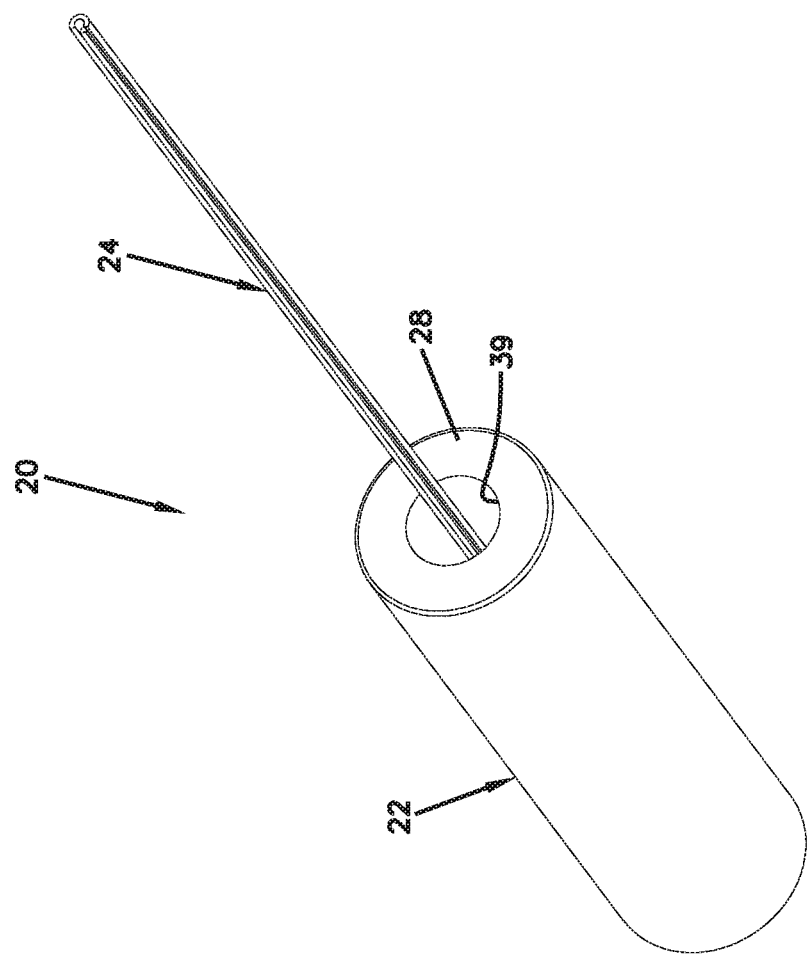
FIG. 2 is a rear, perspective view of the ferrule assembly of FIG. 1.

FIGS. 1 and 2 illustrate a ferrule assembly 20 in accordance with the principles of the present disclosure. The ferrule assembly 20 includes a ferrule 22 and an optical fiber stub 24 secured to the ferrule 22. The ferrule 22 includes a front end 26 (e.g., distal end) positioned opposite from a rear end 28 (e.g., proximal end). The front end 26 preferably includes an end face 30 at which an interface end 32 of the optical fiber stub 24 is located. The ferrule 22 defines a ferrule bore 34 that extends through the ferrule 22 from the front end 26 to the rear end 28. The optical fiber stub 24 includes a first portion 36 secured within the ferrule bore 34 and a second portion 38 that extends rearwardly from the rear end 28 of the ferrule 22. The second portion 38 can be referred to as a "pigtail" or as a "free end portion."

The ferrule 22 is preferably constructed of a relatively hard material capable of protecting and supporting the first portion 36 of the optical fiber stub 24. In one embodiment, the ferrule 22 has a ceramic construction. In other embodiments, the ferrule 22 can be made of alternative materials such as Ultem, thermoplastic materials such as Polyphenylene sulfide (PPS), other engineering plastics or various metals. In example embodiments, the ferrule 22 has a length L1 (see FIG. 3) in the range of 5-15 millimeters (mm), or in the range of 8-12 mm.

The first portion 36 of the optical fiber stub 24 is preferably secured by a bonding agent (e.g., adhesive, epoxy) within the ferrule bore 34 of the ferrule 22. The bonding agent may be in liquid, powder, or gel form when dispensed into the ferrule bore 34. The interface end 32 preferably includes a polished end face accessible at the front end 32 of the ferrule 22.

Referring to FIG. 3, the ferrule bore 34 has a stepped-configuration with a first bore segment 40 having a first diameter d1 and a second bore segment 42 having a second diameter d2. The second diameter d2 is larger than the first diameter d1. A diameter step 44 provides a transition from the first diameter d1 to the second diameter d2. The first bore segment 40 extends from the front end 26 of the ferrule 22 to the diameter step 44. The second bore segment 42 extends from the diameter step 44 toward the rear end 28 of the ferrule 22. The ferrule bore 34 also includes a conical transition 39 that extends from the second bore segment 42 to the rear end 28 of the ferrule 22. In certain embodiments, the first diameter d1 is about 125.5 microns with a tolerance of +1 micron. In certain embodiments, the second diameter d2 can be about 250 microns so as to accommodate a coated optical fiber, or about 900 microns so as to accommodate a coated and buffered optical fiber. In one example, d1 is in the range of 230-260 microns and d2 is in the range of 500-1100 microns.

The first portion 36 of the optical fiber stub 24 includes a bare fiber segment 46 that fits within the first bore segment 40 of the ferrule 22 and a coated fiber segment 48 that fits within the second bore segment 42 of the ferrule 22. The bare fiber segment 46 is preferably bare glass and, as shown at FIG. 4, includes a core 47 surrounded by a cladding layer 49. In a preferred embodiment, the bare fiber segment 46 has an outer diameter that is no more than 0.4 microns smaller than the first diameter d1. In certain embodiments, the coated fiber segment 48 includes one or more coating layers 51 surrounding the cladding layer 49 (see FIG. 5). In certain embodiments, the coating layer or layers 51 can include a polymeric material such as acrylate having an outer diameter in the range of about 230-260 microns. In still other embodiments, the coating layer/layers 51 can be surrounded by a buffer layer 53 (e.g., a tight or loose buffer layer) (see FIG. 6) having an outer diameter in the range of about 500-1100 microns.

The second portion 38 of the optical fiber stub 24 preferably has a length L2 that is relatively short. For example, in one embodiment, the length L2 of the second portion 38 is less than the length L1 of the ferrule 22. In still other embodiments, the length L2 is no more than 20 mm, or is no more than 15 mm, or is no more than 10 mm. In still other embodiments, the length L2 of the second portion 38 is in the range of 1-20 mm, or in the range of 1-15 mm, or in the range of 1-10 mm, or in the range of 2-10 mm, or in the range of 1-5 mm, or in the range of 2-5 mm, or less than 5 mm, or less than 3 mm, or in the range of 1-3 mm.

Figure 7:
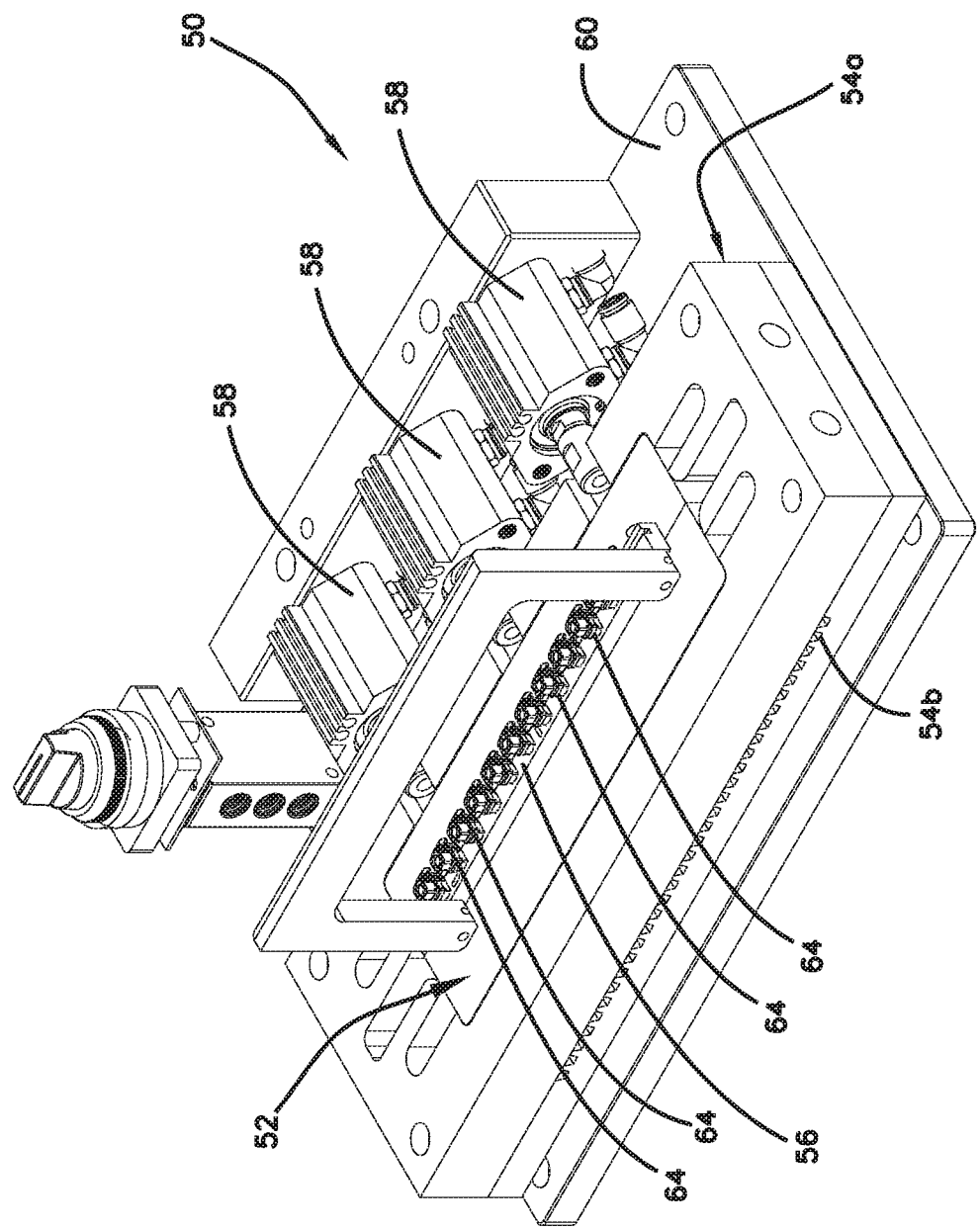
FIG. 7 is a perspective view of an exemplary conductive assembly in accordance with the principles of the present disclosure.
Figure 8:
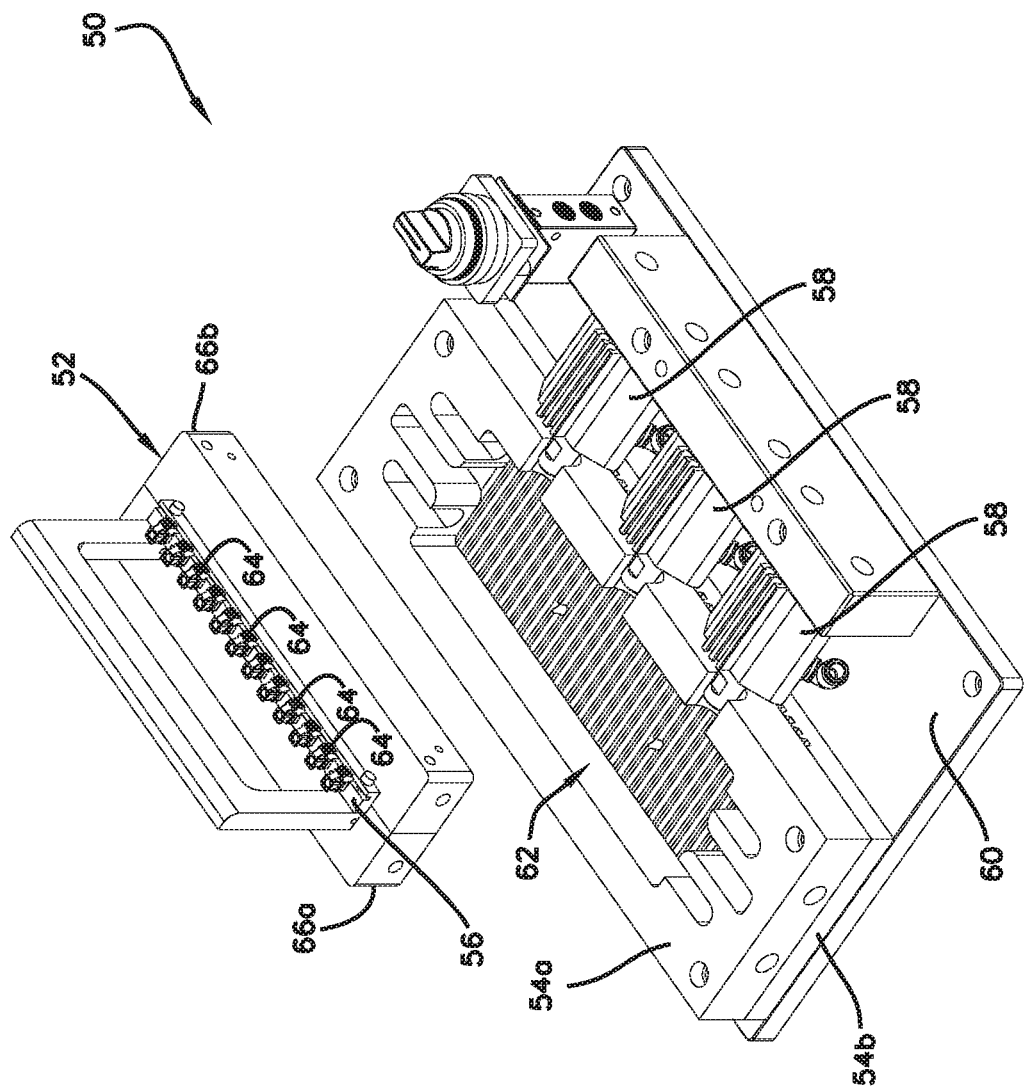
FIG. 8 is an exploded view of a portion of the conductive assembly of FIG. 7 showing a heater device in accordance with the principles of the present disclosure.
Figure 9:
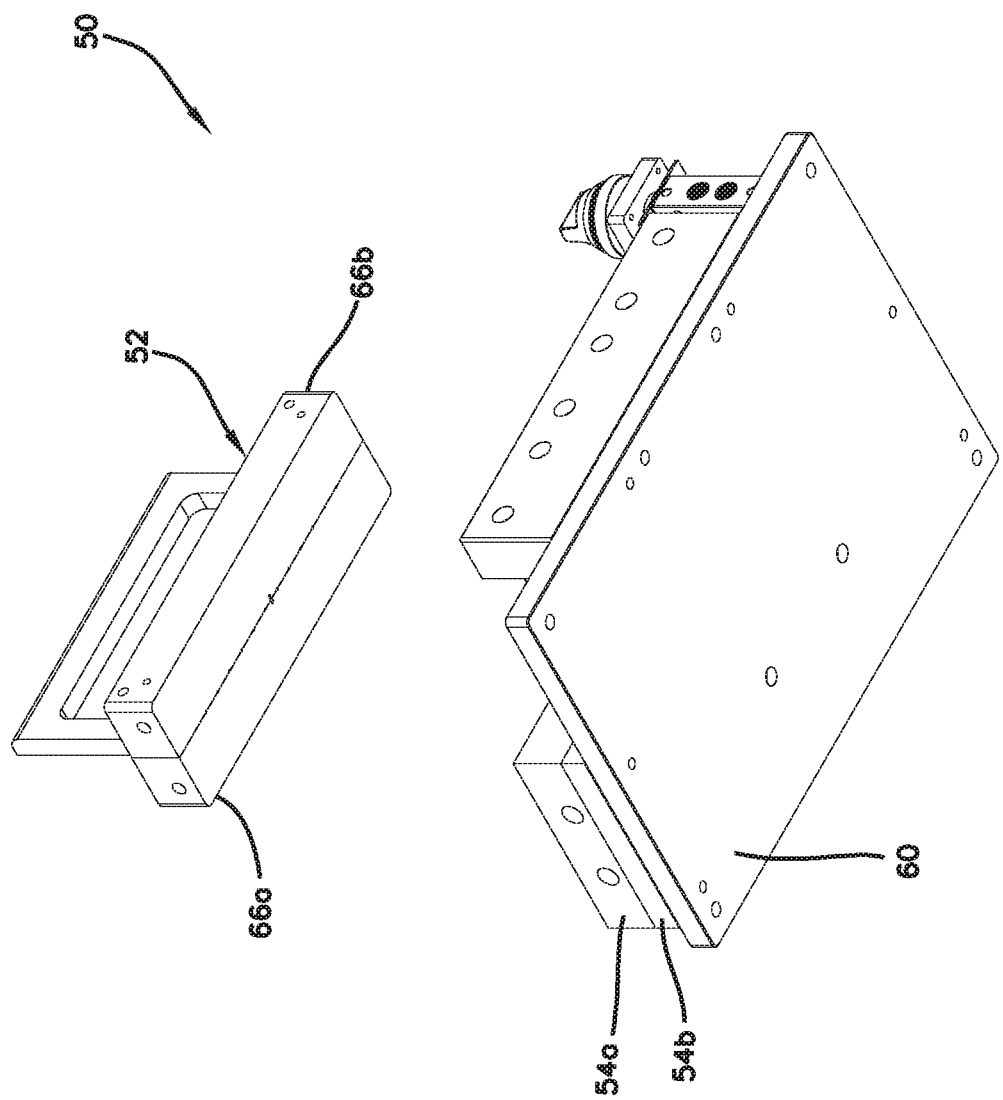
FIG. 9 is a bottom perspective view of the conductive assembly of FIG. 8.

FIGS. 7-9 illustrate perspective views of an example conductive assembly 50 in accordance with the principles of the present disclosure. In this example, the conductive assembly 50 includes a heater device 52, first and second insulation plates 54a, 54b, a connector load carrier 56, air cylinder clamps 58, and a base plate 60. In FIGS. 8-9, the heater device 52 is shown removed from the conductive assembly 50.

The heater device 52 can be mounted within a receptacle 62 (i.e., interior area, cavity, opening, chamber, pocket) defined by the first and second insulation plates 54a, 54b. The heater device 52 can be used to transfer conductive heat to a portion of the ferrule 22 of a fiber optic connector 64 (e.g., SC-type connector, LC-type connector, MPO, etc.) for securing the optical fiber stub 24 therein. The heater device 52 is illustrated and described in more detail with reference to FIGS. 10-12 and 19-22.

The first and second insulation plates 54a, 54b can be any device having a plurality of walls forming the receptacle 62. The first and second insulation plates 54a, 54b are in thermally conductive contact with the heater device 52 so that the heat generated by the heater device 52 remains insulated. The first and second insulation plates 54a, 54b are illustrated and described in more detail with reference to FIG. 18.

The connector load carrier 56 can be configured to receive one or more fiber optic connectors 64. The connector load carrier 56 can be utilized to provide accurate positioning of the connectors 64 in the heater device 52. The connector load carrier 56 can have suitable structure to permit the connector load carrier 56 being removably coupled (e.g., separately coupled) to the heater device 52. The connector load carrier 56 is illustrated and described in more detail with reference to FIGS. 15-17.

The air cylinder clamps 58 can be arranged and configured on the base plate 60, although alternatives are possible. The air cylinder clamps 58 can be arranged next to each other or one above the other to provide a clamping force on the heater device 52. The air cylinder clamps 58 are illustrated and described in more detail with reference to FIG. 23.

Figure 10:
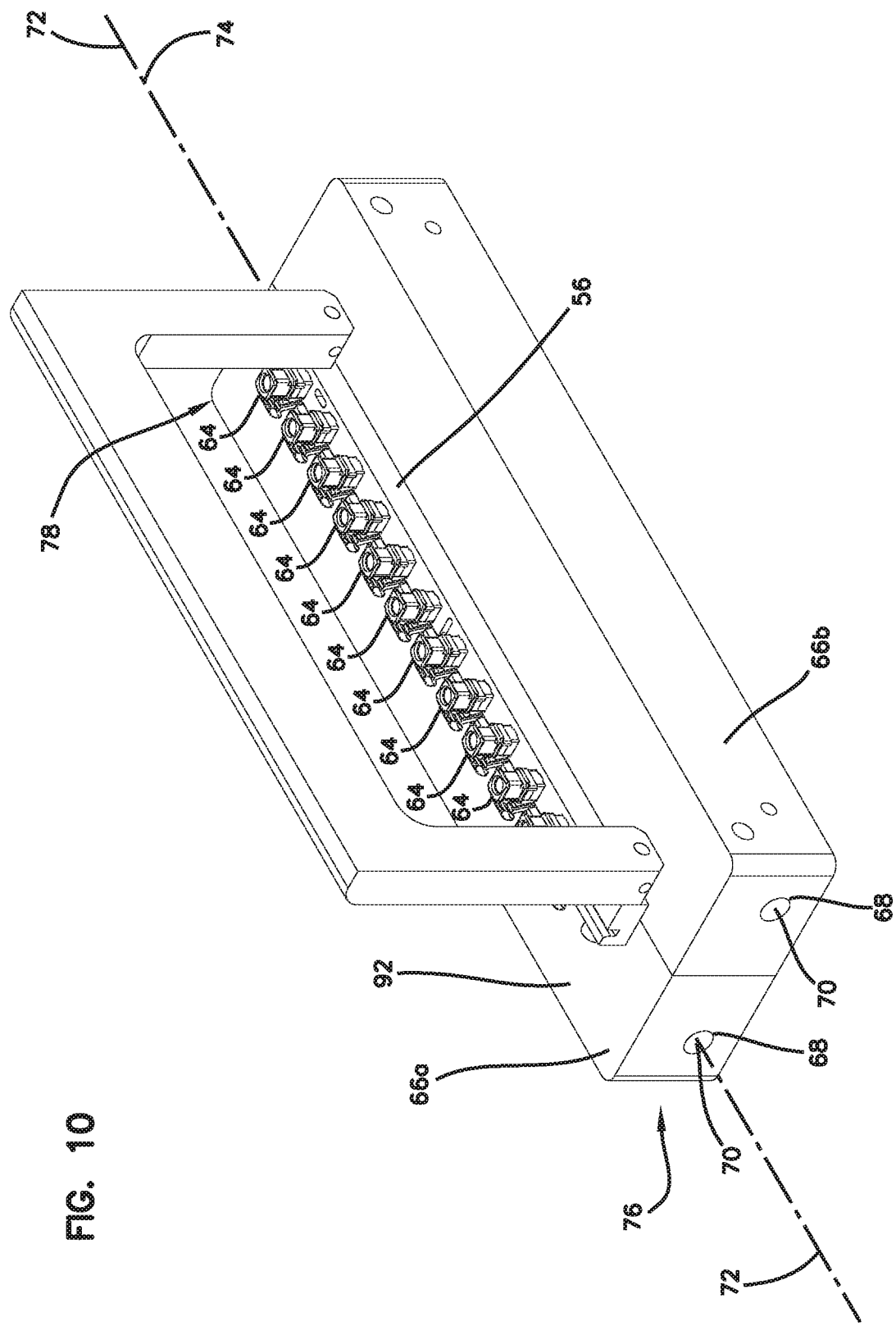
FIG. 10 is a perspective view of the heater device of FIG. 8.
Figure 11:
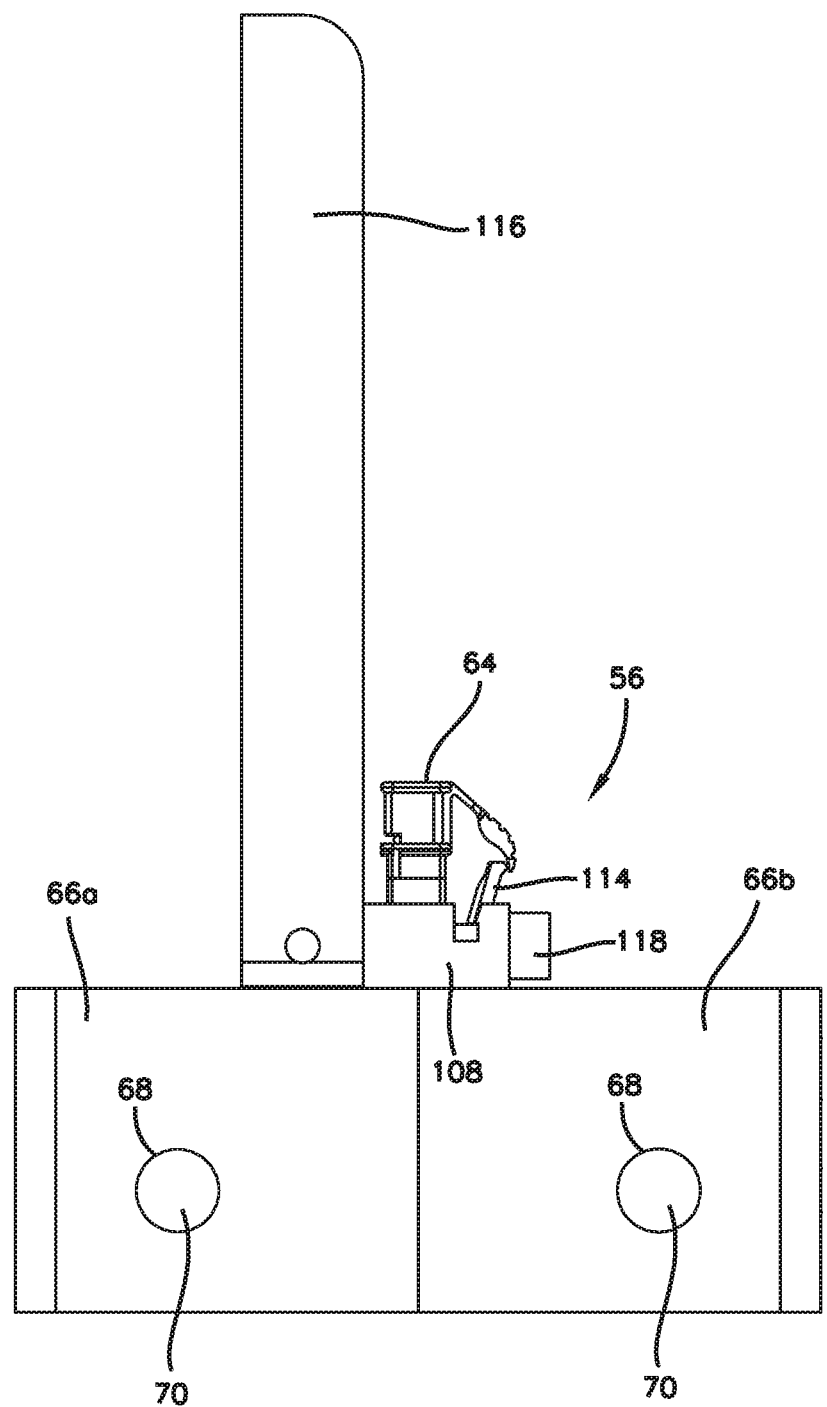
FIG. 11 is a side perspective view of the heater device of FIG. 8.
Figure 12:
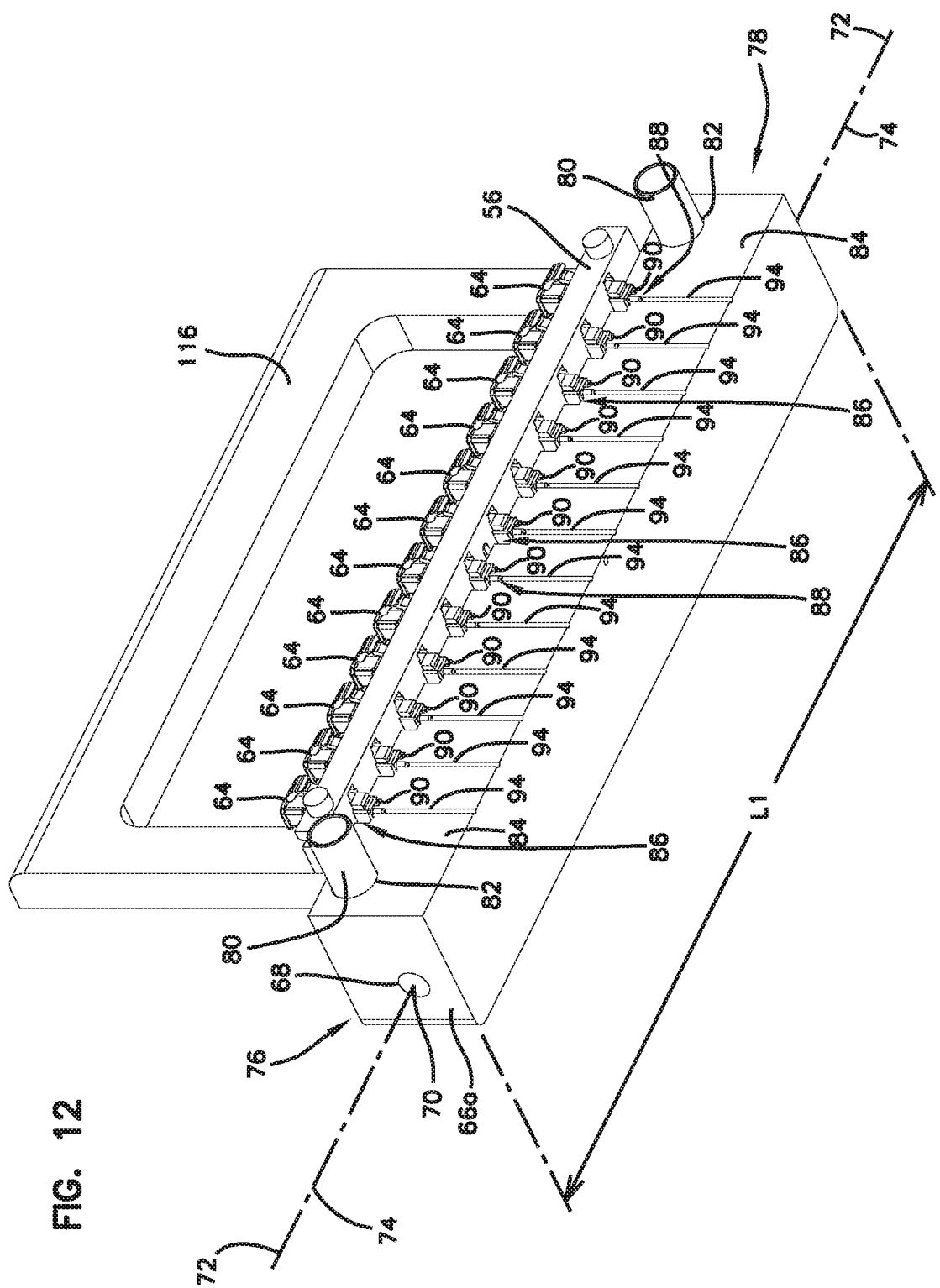
FIG. 12 is a perspective view of a first heater block of the heater device of FIG. 8.

FIGS. 10-12 illustrate features of the heater device 52. The heater device 52 can include a first heating block 66a and a second heating block 66b, although alternatives are possible. In the example depicted, the first and second heating blocks 66a, 66b are positioned side-by-side such that the first and second heating blocks 66a, 66b can be used as a pair, although alternatives are possible. In certain examples, a single heating block may be used. The first and second heating blocks 66a, 66b can be arranged and configured to mate or cooperate together inside the receptacle 62 defined by the first and second insulation plates 54a, 54b. The heating blocks 66a, 66b can be made with a material having suitable thermal conductivity, such as metal (e.g., brass, aluminum, etc.), that permits the rapid transmission of heat. It will be appreciated that the first and second heating blocks 66a, 66b may have identical material compositions and geometries, although alternatives are possible.

Although rectangular heating blocks are depicted, it will be appreciated that the heating device 52 may be arranged and configured as a cylindrical block, a truncated triangular block, a wedge-shaped block, a portion of a cylinder, a portion of an annulus, or other shapes.

In the illustrated example, the first heating block 66a is identical to the second heating block 66b; as such, only the first heating block 66a will be described herein. Those of skill in the art will appreciate that the discussion of the first heating block 66a applies equally to the second heating block 66b. Also, in certain examples the first and second heating blocks 66a, 66b may not be identical.

In certain examples, pre-formed notches 68 (e.g., openings, apertures) can be formed in the first heating block 66a for receiving heating elements (not shown), such as, electric cartridge heaters, although alternatives are possible.

Various configurations of electric cartridge heaters are known in the prior art. A typical cartridge heater includes a metal sheath around a resistance-wire heating element coiled around a core of insulating material. An insulating filler material with appropriate thermal conductivity and electrical insulating properties is used to fill the space between the coil and the sheath. Granulated magnesium oxide is typically used as the insulating filler material. After the sheath is filled, the sheath is subjected to compression forces, for example, by swaging. Compression compacts the granulated magnesium oxide and improves its dielectric and thermal conductivity properties. Lead wires may be attached to the coil before or after filling the sheath and may be held in place with an end plug made of materials such as Teflon, mica and silicone rubber.

In certain examples, the pre-formed notches 68 of the first heating block 66a can be fixed sized holes (e.g., a rigid hole) that each define a passage 70 to receive the heating element.

Herein by the term, "fixed" and variants thereof, in this context, it is meant that the diameter of the fixed sized holes does not change when the heating element is inserted therein.

The passage 70 can extend along an insertion axis 72. The first heating block 66a defines a longitudinal axis 74 that extends through the first heating block 66a in an orientation that extends from a front end 76 to a rear end 78 of the first heating block 66a. The fixed sized holes can each have a fixed effective diameter, although alternatives are possible. The fixed effective diameter of the fixed sized holes may be larger than a nominal diameter of the heating element that is intended to be inserted therethrough. The fixed sized holes are generally round holes. The fixed sized holes of the first heating block 66a can have a rigid construction that allows the fixed sized holes to be machined to very tight tolerances. The fixed sized holes are arranged and configured to remain the same size and not change over time.

In certain examples, the pre-formed notches 68 can be defined at both the front and rear ends 76, 78 of the first heating block 66a such that the passage 70 extends entirely through a length L1 (see FIG. 12) of the first heating block 66a from the front end 76 to the rear end 78, although alternatives are possible. For example, the passage 70 may extend partially along the length L1 of the first heating block 66a from the front end 76 and/or the rear end 78. The insertion axis 72 corresponds with the longitudinal axis 74 of the first heating block 66a.

In certain examples, the passage 70 of the pre-formed notches 68 can have different transverse cross-sectional shapes such as octagonal shapes, circular shapes, triangular shapes, square shapes, or other shapes.

FIG. 12 shows the first heating block 66a without the second heating block 66b. In certain examples, the first and second heating blocks 66a, 66b are held together by means of two pins 80 therebetween. The pins 80 are inserted into holes 82 (e.g., openings, apertures)(see FIG. 16) defined by mating surfaces 84 in each of the first and second heating blocks 66a, 66b. Each pin 80 is slidable into the first and second heating blocks 66a, 66b when a clamping force is applied so as to bring the first and second blocks together 66a, 66b.

The mating surface 84 defines a connector mounting section 86 (e.g., retaining structure) and a ferrule mounting section 88 (e.g., heating portion of the fiber optic connector). The connector mounting section 86 can be utilized to provide an opening 90 (e.g., receptacle) for the fiber optic connector 64. The opening 90 of the connector mounting section 86 extends from the mating surface 84 to a top surface 92 (see FIGS. 10 and 15) of the first heating block 66a such that the fiber optic connector 64 can slide laterally into and engage the connector mounting section 86, although alternatives are possible. In certain examples, the fiber optic connector 64 can be inserted vertically from above the first heating block 66a to engage the connector mounting section 86, although alternatives are possible. The first and second heating blocks 66a, 66b can be configured with a plurality of differently sized connector mounting sections and/or configured recesses or apertures, adapted to receive a variety of sizes or types of optical fiber terminations therein.

One or more longitudinal openings 94 (e.g., slots, recesses, cavities, grooves) can be provided in the ferrule mounting section 88 of both the first and second heating blocks 66a, 66b. The first and second heating blocks 66a, 66b can be intermating half-pieces that cooperate to define a heating chamber 96 (e.g., cavity, passage)(see FIG. 21) for receiving a portion of the ferrule 22. The heating chamber 96 can be defined by the longitudinal openings 94 of the first and second heating blocks 66a, 66b. The longitudinal openings 94 defined in each of the first and second heating blocks 66a, 66b can include half-cylindrical interfaces 87 in the ferrule mounting section 88. As such, when the first and second heating blocks 66a, 66b are mated together with the ferrule 22 mounted therebetween, the half-cylindrical interfaces 87 formed by the longitudinal openings 94 of the first and second heating blocks 66a, 66b together completely and circumferentially surround the ferrule 22 and are in direct thermal contact therewith.

The first and second heating blocks 66a, 66b cooperate together such that the half-cylindrical interfaces 87 of the longitudinal openings 94 defined in the first and second heating blocks 66a, 66b together form the heating chamber 96 adapted to receive a portion of the ferrule. Heat is conducted via the first and second heating blocks 66a, 66b directly to the portion of the ferrule 22 mounted in the heating chamber 96 to cure the adhesive therein.

Because the first and second heating blocks 66a, 66b are made out of a material with good thermal conductivity, when heated, the process of curing (hardening) the adhesive within the ferrule is set up in such a way as to have a short cure time, between about 5 seconds and about 90 seconds, although alternatives are possible. Typically, the cure time is no more than about 60 seconds, although alternatives are possible. Usually, the cure time is at least 10 seconds. The rapid curing is achieved by conductive heating in which direct contact of the first and second heating blocks 66a, 66b is with the portion of the ferrule 22. The design of the first and second heating blocks 66a, 66b permits rapid heat transfer therefrom to the portion of the ferrule 22 being treated. The rapid curing process will be discussed in more detail hereinafter.

In certain examples, the operating temperature of the first and second heating blocks 66a, 66b can range from about 73° F. to about 500° F., although alternatives are possible. Typically, the operating temperature of the first and second heating blocks 66a, 66b can be about 300° F., although alternatives are possible.

Figure 13:
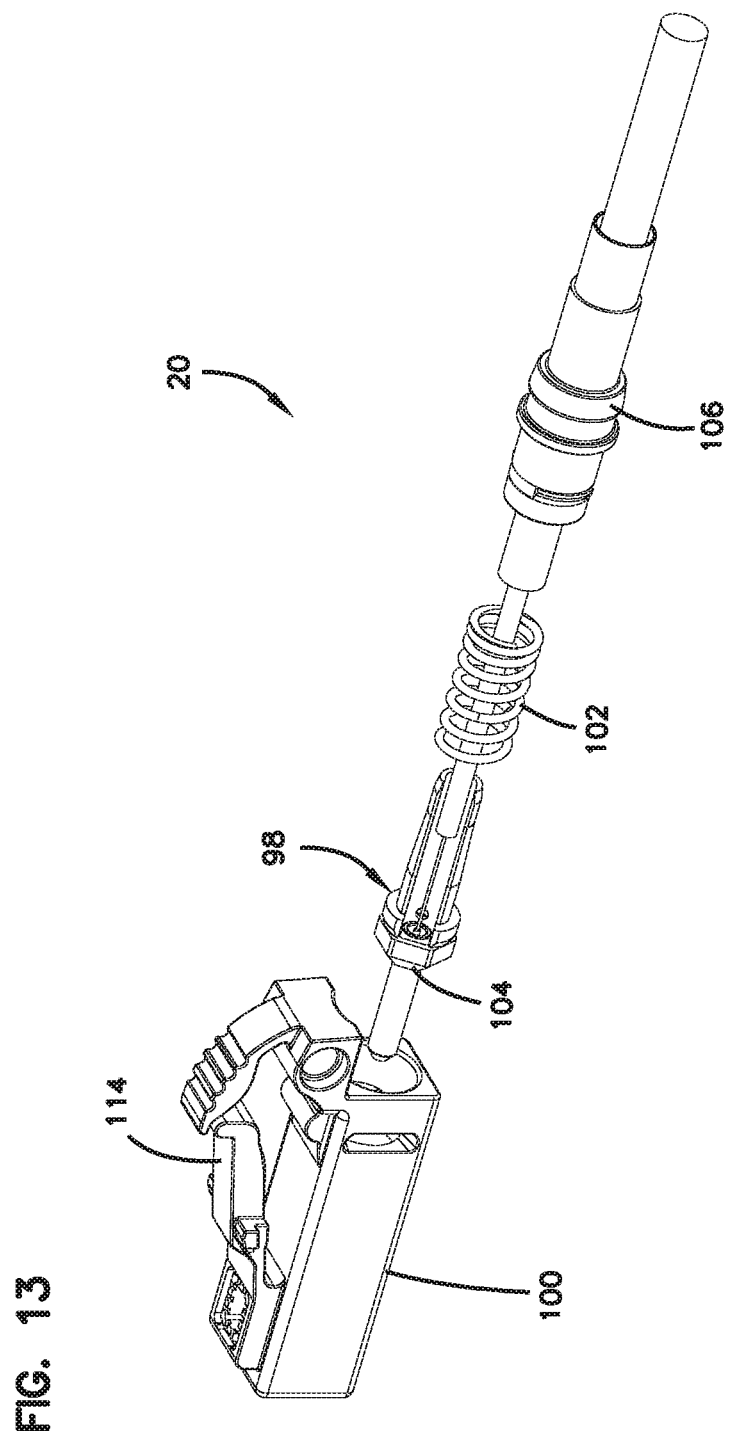
FIG. 13 is an exploded view illustrating a LC-style connector incorporating the ferrule and hub assembly of FIGS. 1 and 3.
Figure 14:
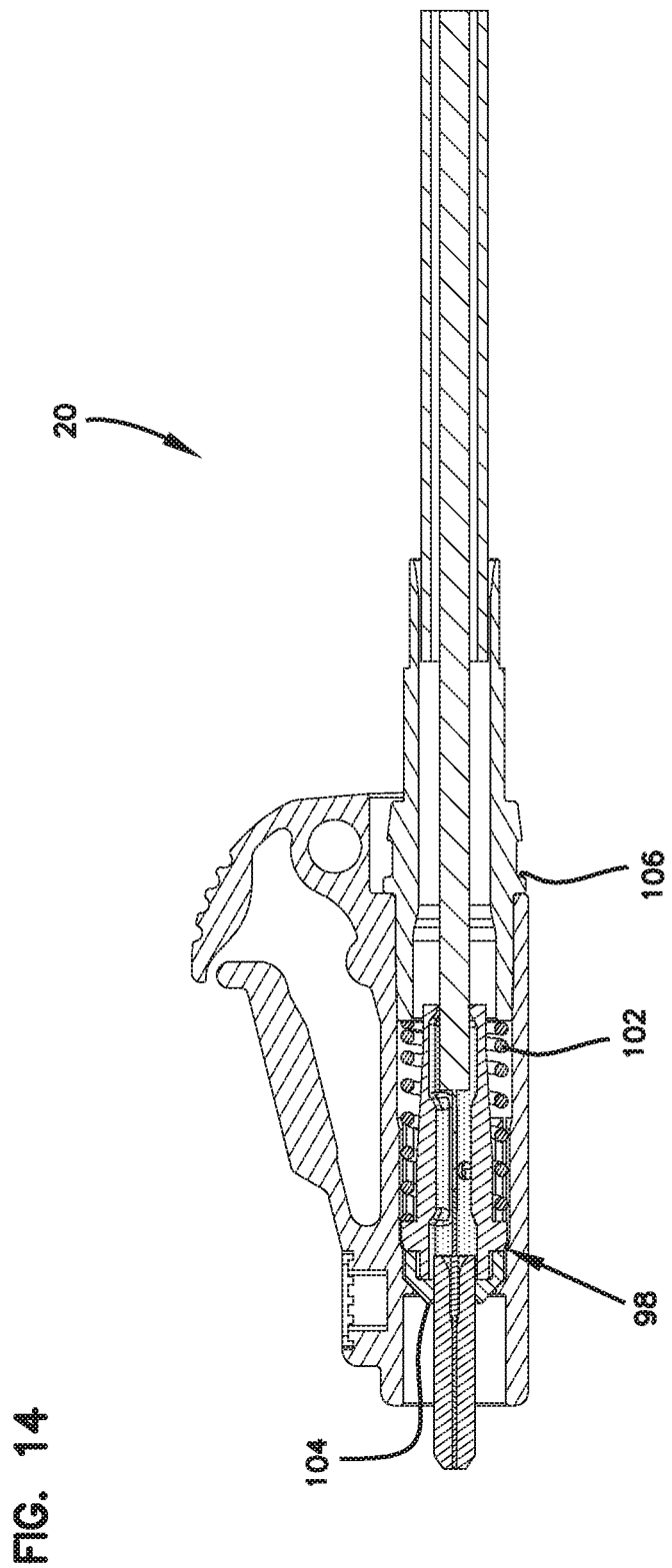
FIG. 14 is a cross-sectional view of the connector of FIG. 13.

FIGS. 13 and 14 show the example fiber optic connector 64 that includes the ferrule assembly 20 and a hub 98. The fiber optic connector 64 includes a main connector body 100 having a standard LC-style form factor and mechanical latching arrangement. The fiber optic connector 64 also includes a spring 102 for biasing the ferrule assembly 20 and the hub 98 in a forward direction such that a chamfered section 104 of the hub 98 seats within the main connector body 100. The fiber optic connector 64 further includes a rear housing 106 that retains the spring 102 within the main connector body 100.

In certain examples, the combination of the ferrule 22, the optical fiber 24, and the adhesive may be externally supported, for example, in a jig used during the assembly, until the adhesive has cured, thus providing sufficient mechanical support to fixate the optical fiber 24 within the ferrule. In certain examples, the ferrule connector is not pre-loaded. The ferrule connector can be externally supported during manufacturing in which the optical fiber and adhesive is inserted therein.

Figure 15:
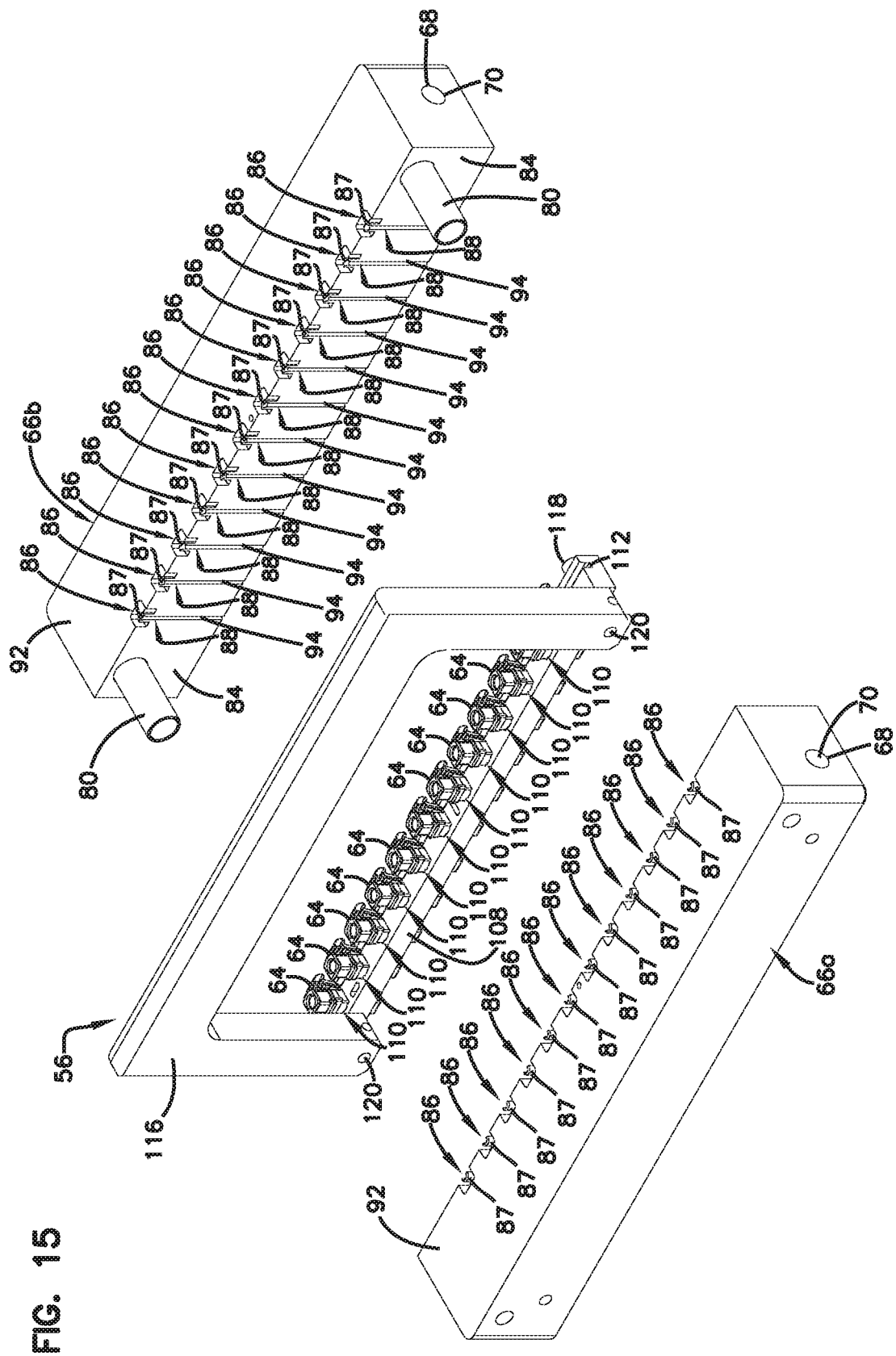
FIG. 15 is an exploded front view of the heater device of FIG. 10 depicting first and second heater blocks and a connector load carrier in accordance with the principles of the present disclosure.
Figure 16:
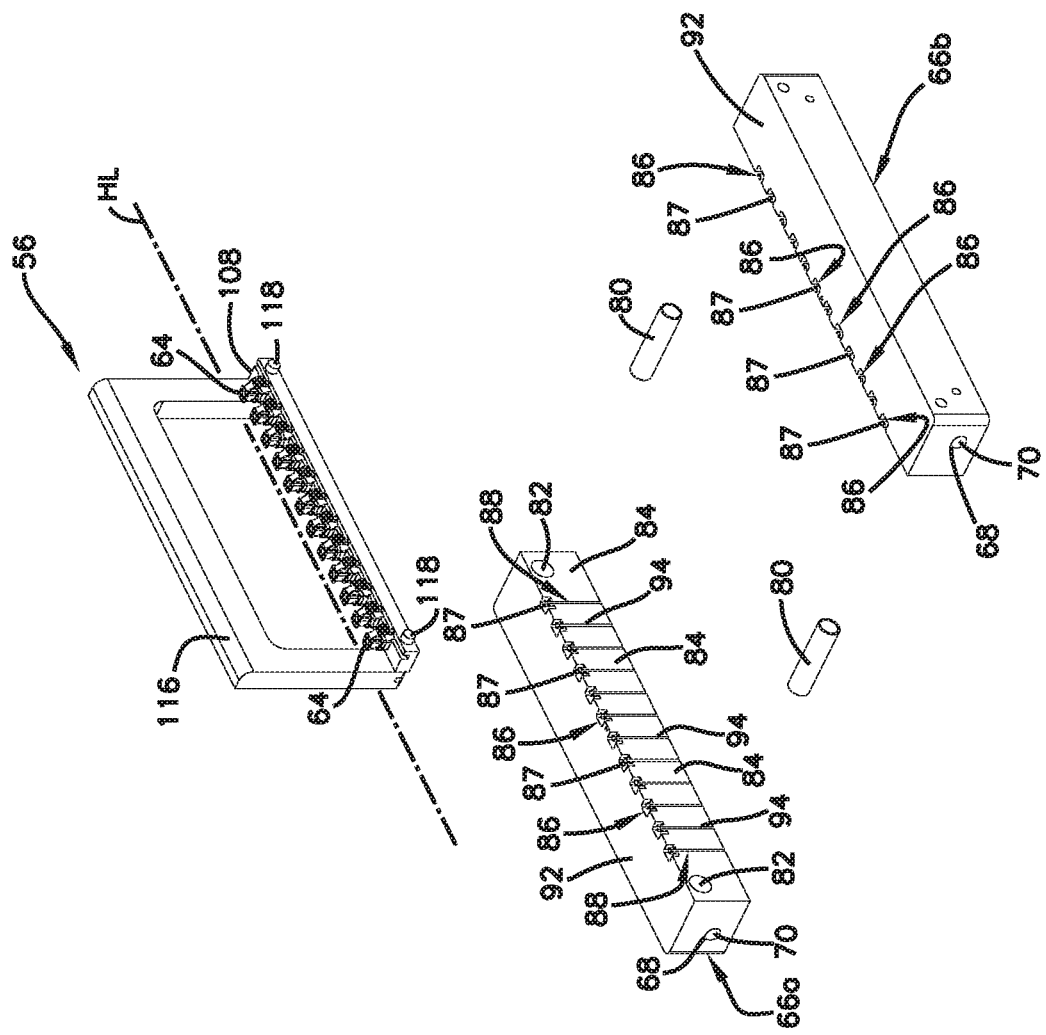
FIG. 16 is an exploded rear view of the heater device of FIG. 15 depicting the connector load carrier elevated above the first and second heater blocks.
Figure 17:
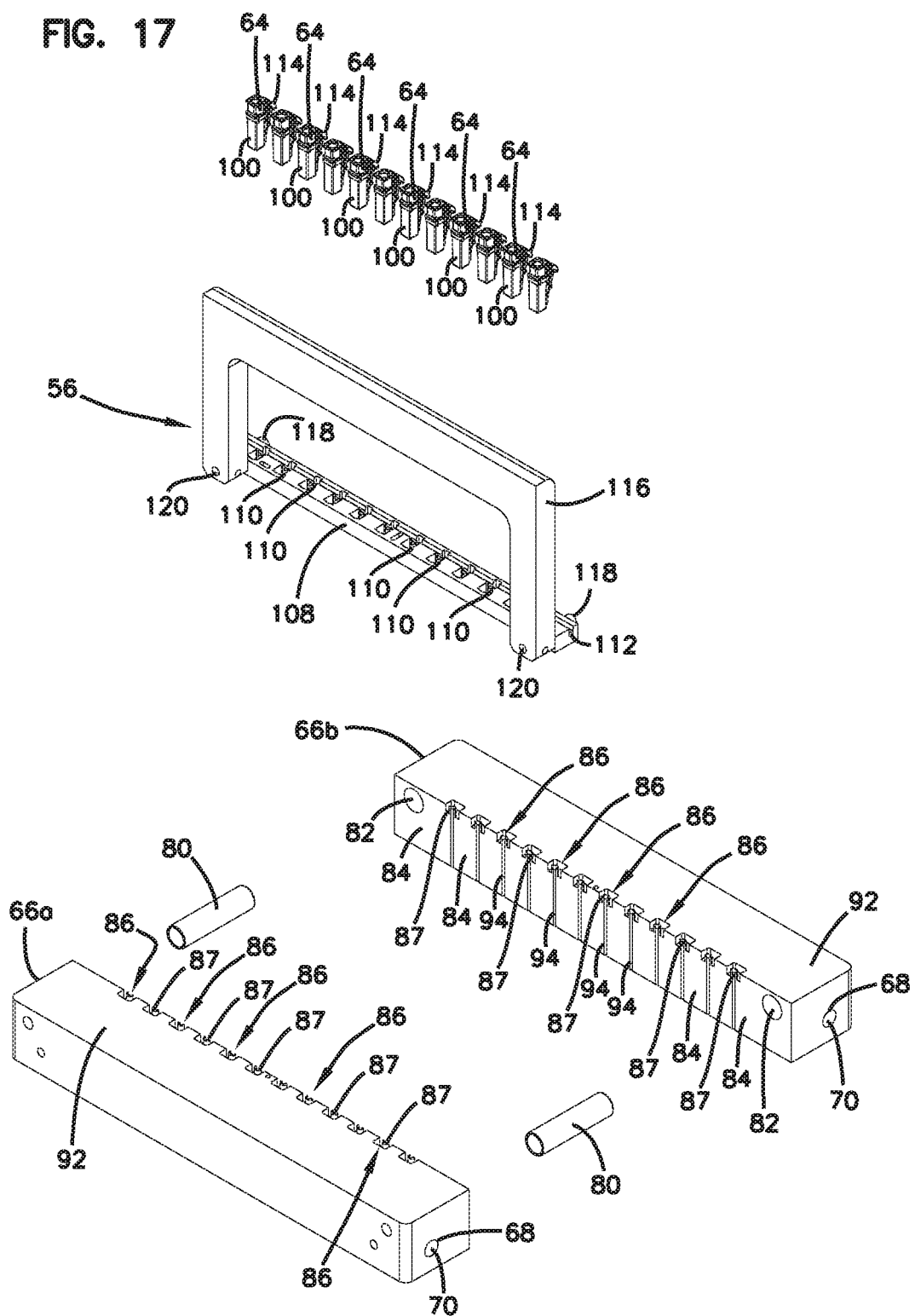
FIG. 17 is a further exploded front view of the connector load carrier of FIG. 16.

Turning to FIGS. 15-17, the connector load carrier 56 includes a main body 108 that defines a plurality of connector openings 110, although alternatives are possible. One or more fiber optic connectors 64 can be respectively mounted (e.g., snapped) in the connector openings 110 of the connector load carrier 56. In certain examples, the connector load carrier 56 can be configured with a plurality of differently sized connector openings and/or configured recesses or apertures, adapted to receive a variety of sizes or types of optical fiber terminations therein.

The connector load carrier 56 can be adapted to hold the fiber optic connectors 64 in relationship with the first and second heating blocks 66*a*, 66*b*, although alternatives are possible. When the connector load carrier 56 is positioned on or in connection (e.g., attached, coupled, engaged) with the first and second heating blocks 66*a*, 66*b*, the main connector body 100 does not directly contact the first and second heating blocks 66*a*, 66*b*. That is, the main connector body 100 is positioned outside of the first and second heating blocks 66*a*, 66*b* of the heater device 52 such that the main connector body 100 is not directly exposed to the conductive heating. The main connector body 100 is not heated to a temperature that would cause significant thermal distortion or damage.

The fiber optic connector 64 is positioned within the heating chamber 96 such that the hub 98 of the ferrule 22 can be arranged and configured to be in direct contact with the first and second heating blocks 66*a*, 66*b*.

When the connector load carrier 56 with the fiber optic connectors 64 is mounted (e.g., connected to, positioned, engaged to) on the first and second heating blocks 66*a*, 66*b*, the first and second heating blocks 66*a*, 66*b* are in thermal contact with a portion of the ferrule 22. Heat from an electrically operated heating element may be conducted, via the first and second heating blocks 66*a*, 66*b*, to the ferrule 22, promoting rapid curing of the adhesive therein. That is, conductive heat transfer can occur from the first and second heating blocks 66*a*, 66*b* directly to the ferrule 22 to rapidly cure the adhesive within the ferrule bore 34 while reducing the likelihood of an overheating of the main connector body 100. The adhesive can be cured rapidly without applying excessive heat to plastic components of the fiber optic connector 64.

In certain examples, the fiber optic connectors 24 can be pre-loaded with a thermoplastic adhesive that can rapidly harden when exposed to the conductive heat from the heater device 52. In certain examples, the optical fiber 24 can be positioned within the ferrule 22 of the fiber optic connector 24 prior to the fiber optic connector 24 being mounted within the heater device 52. In certain examples, the optical fiber 24 can be inserted within the ferrule 22 of the fiber optic connector 24 after the fiber optic connector 24 has been mounted within the heater device 52.

The connector load carrier 56 can define a groove 112 (e.g., recess, channel, etc.) that provides a snap-fit-connection for receiving a latch 114 of the fiber optic connector 64 such that the fiber optic connector 64 snap mounts to the connector load carrier 56. In certain examples, the connector load carrier 56 can include a linear array (e.g., a row) of the connector openings 110, although alternatives are possible. Two or more arrays could be provided. In certain examples, the fiber optic connectors 64 can be aligned along a horizontal line HL such that the fiber optic connectors 64 are aligned together in a row, side-by-side as depicted in FIG. 16, although alternatives are possible. In some examples, the fiber optic connectors 64 may be positioned in a staggered configuration. In certain examples, the fiber optic connectors 24 can be mounted in the heater device 52 without utilizing the connector load carrier 56.

The connector load carrier 56 can include a handle member 116 that extends from the main body 108. The handle member 116 can be made integral (e.g., a single, integrally molded piece, formed in one seamless piece) with the main body 108 or coupled to, the main body 108, although alternatives are possible. The connector load carrier 56 can be manually lifted by grabbing the handle member 116 to insert or remove the main body 108 of the connector load carrier 56 relative to the first and second heating blocks 66*a*, 66*b*, although alternatives are possible.

In certain examples, one or more fasteners 118 (e.g., a nail, screw, bolt, stud, boss, or the like) may be used to couple the handle member 116 to the main body 108. The fastener 118 can be received within apertures 120 (e.g., openings) defined in the handle member 116. The apertures 120 can align with openings (not shown) defined in the main body 108 which are adapted to receive the fastener 118. The fasteners 118 pass through the apertures 120 of the handle member 116 and the openings in the main body 108 to secure the handle member 116 to the main body 108. The handle member 116 and the main body 108 can be made with a metallic material, although alternatives are possible.

Figure 18:
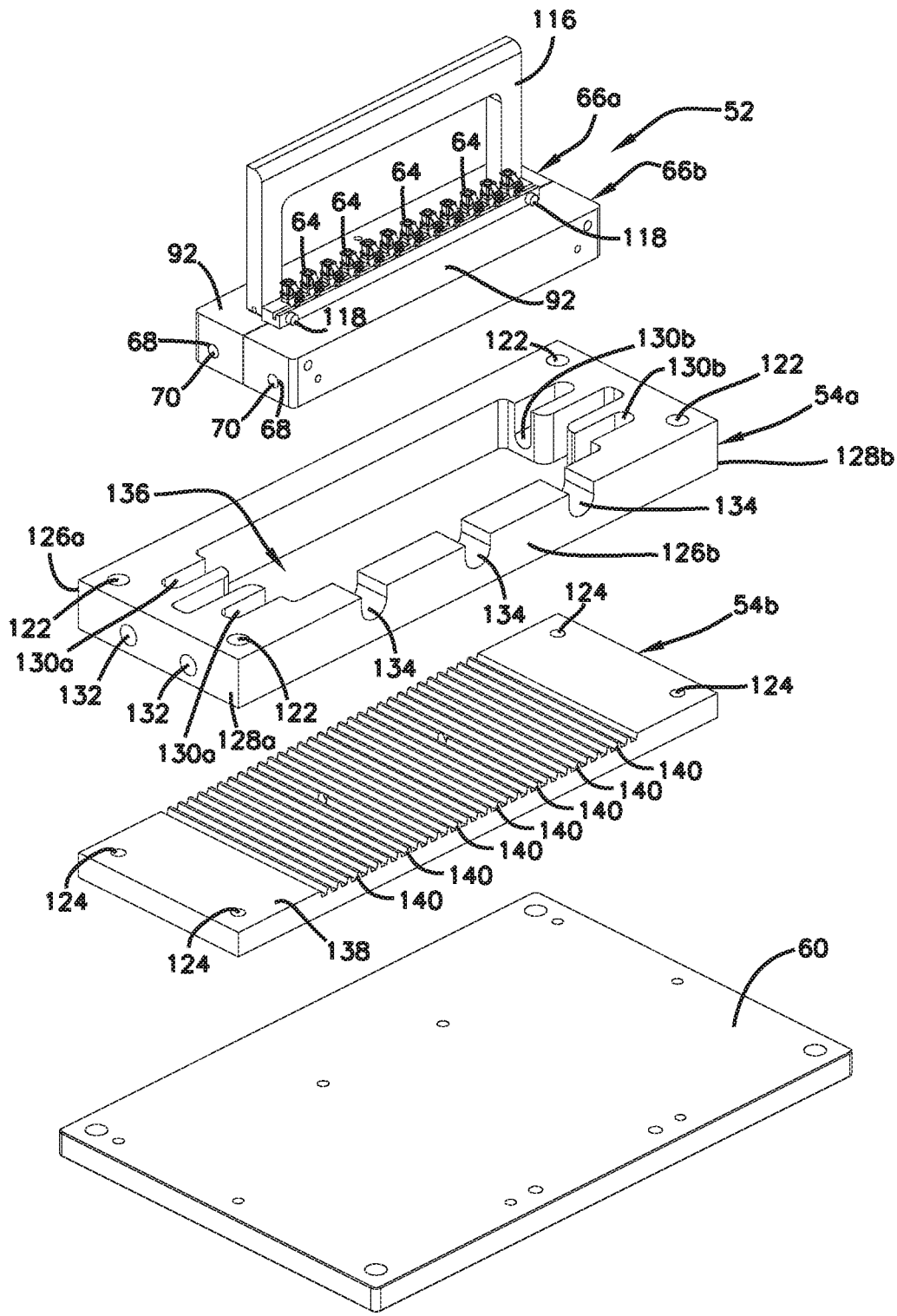
FIG. 18 is an exploded perspective view of the conductive assembly of FIG. 7 depicting first and second insulation plates in accordance with the principles of the present disclosure.
Figure 19:
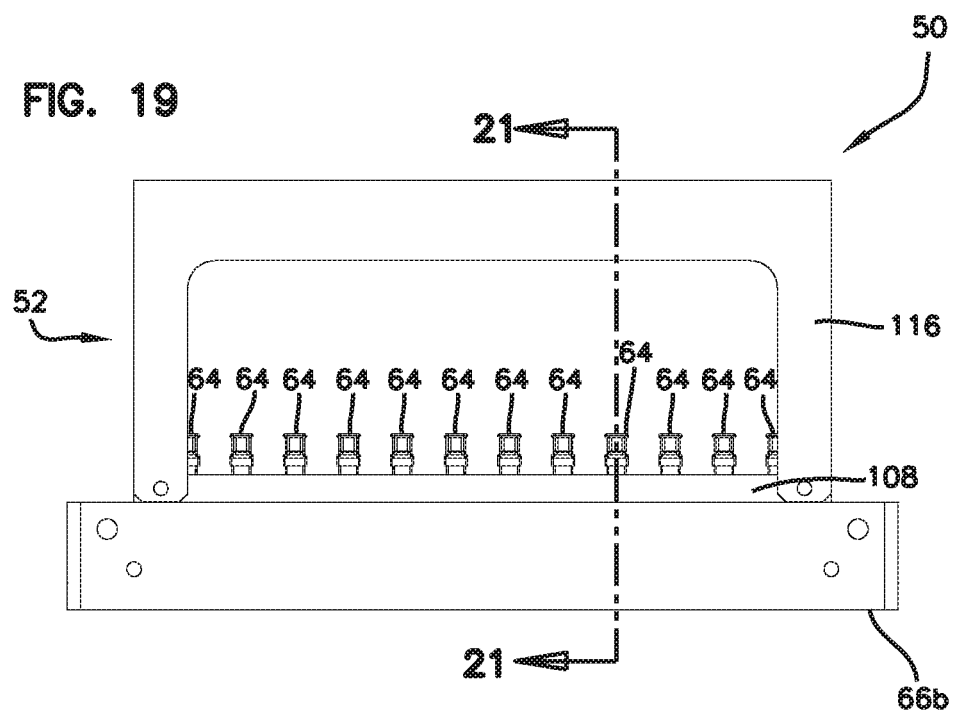
FIG. 19 is a front perspective view of the conductive assembly of FIG. 7.
Figure 20:
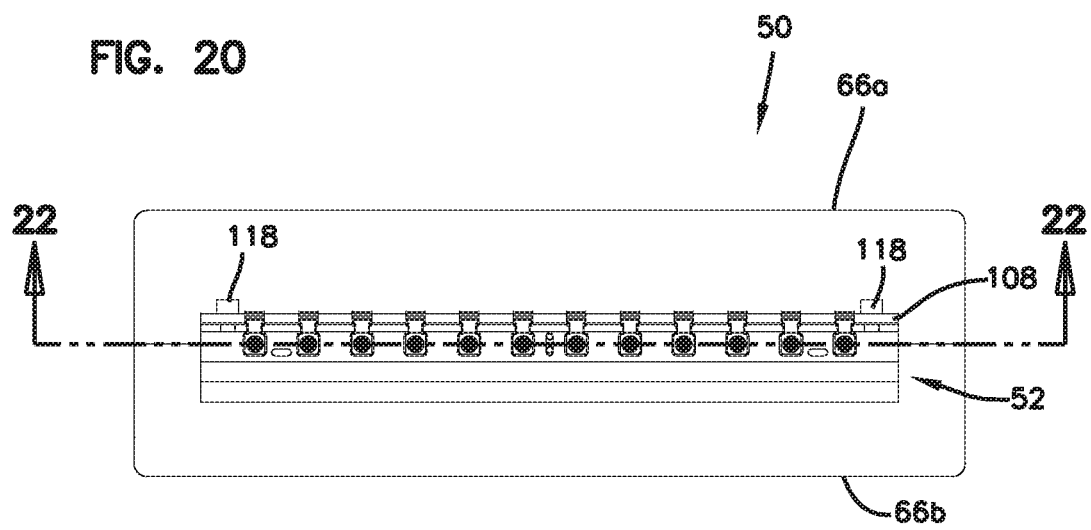
FIG. 20 is a top perspective view of the conductive assembly of FIG. 7.

Turning to FIG. 18, an exploded view of the first and second insulation plates 54*a*, 54*b* is depicted. Although the first and second insulation plates 54*a*, 54*b* are generally shown as rectangular in shape, it will be appreciated that other shapes are possible. The first and second insulation plates 54*a*, 54*b* can be attached to or connected together. In certain examples, the first and second insulation plates 54*a*, 54*b* can be attached or coupled together by a post, or some other fastener, although alternatives are possible. The first and second insulation plates 54*a*, 54*b* may define respective openings 122, 124 that align together, when the first and second insulation plates 54*a*, 54*b* are attached, for receiving such fasteners. In certain examples, the first and second insulation plates 54*a*, 54*b* may be permanently attached together.

In certain examples, the heater device 52 may include a single insulation plate 54 or other structure, although alternatives are possible. In other examples, the heater device 52 may include a plurality of insulation plates 54, although alternatives are possible.

The first insulation plate 54*a* can include opposite first and second side walls 126*a*, 126*b* and opposite first and second end walls 128*a*, 128*b*. The first and second end walls 128*a*, 128*b* can respectively extend between the first and second side walls 126*a*, 126*b* generally perpendicular thereto. In certain examples, double channels 130*a*, 130*b* (e.g., slots, grooves) can be formed near respective first and second end walls 128*a*, 128*b* of the first insulation plate 54*a*. The opposite first and second end walls 128*a*, 128*b* can define openings 132. The openings 132 can be arranged and configured to align with the passages 70 of the first and second heating blocks 66a, 66b when the heater device 52 is mounted within the receptacle 62. As such, a heating element can be routed through the openings 132 of the first insulation plate 54a, the double channels 130a, 130b of the first insulation plate 54a and into the passages 70 of the heating blocks 66a, 66b. In certain examples, at least one of the first and second side walls 126a, 126b of the first insulation plate 54a may include one or more channel grooves 134 (e.g., half circle, sphere, etc.) formed therein for receiving a linear actuator 57.

The first insulation plate 54a can also define a central opening 136 that leads to a top surface 138 of the second insulation plate 54b. In certain examples, the top surface 138 defines a plurality of channels 140 (e.g., longitudinal parallel grooves) that are adapted to reduce surface contact with the heater device 52 when the heater device 52 is mounted in the receptacle 62. A reduction in surface contact between the heater device 52 and the second insulation plate 54b at the channels 140 minimizes heat transfer from the heater device 52 to the second insulation plate 54b.

Figure 21:
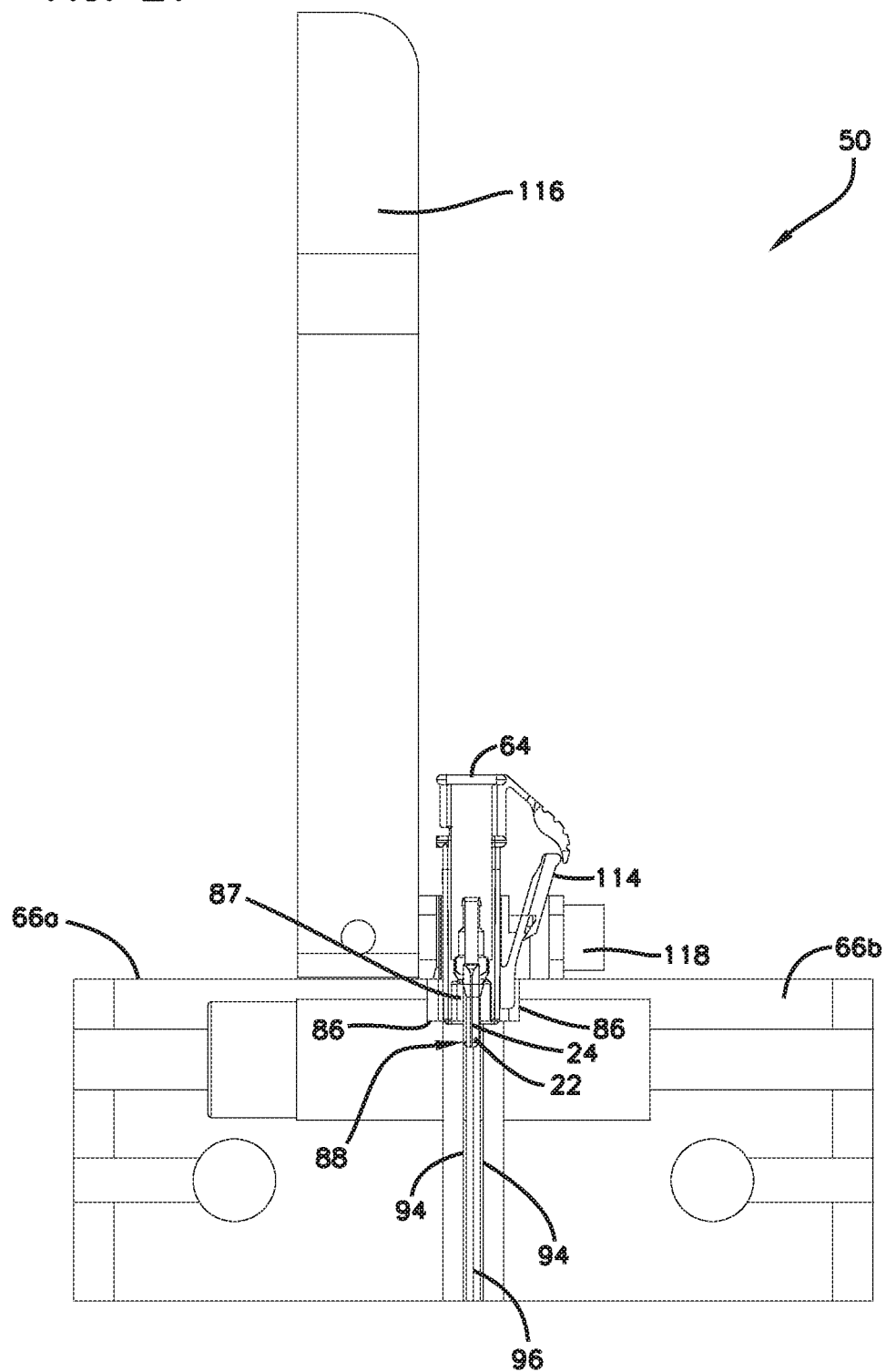
FIG. 21 is a cross-sectional view taken along section line 21-21 of FIG. 19.
Figure 22:
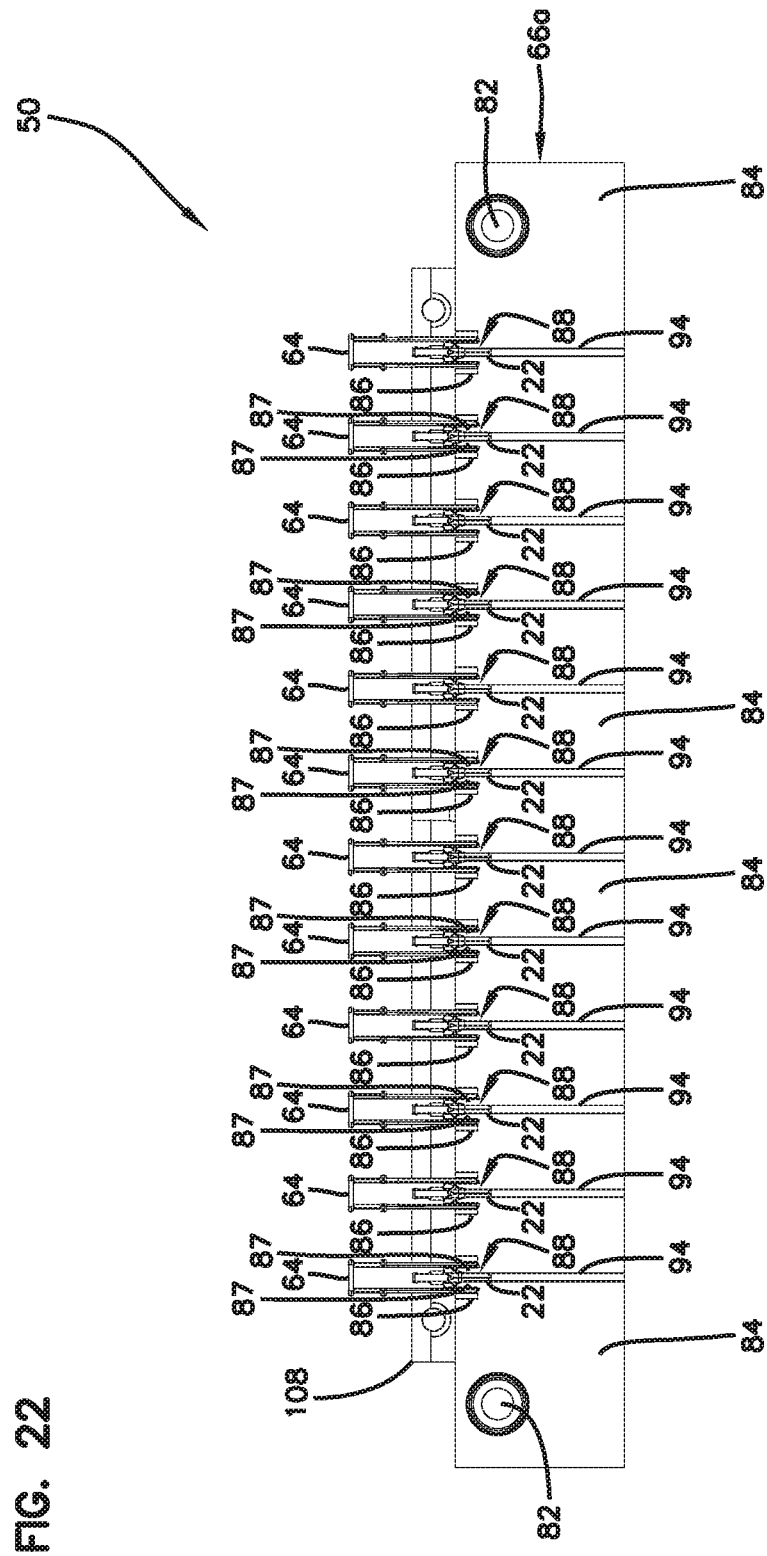
FIG. 22 is a cross-sectional view taken along section line 22-22 of FIG. 20.

Referring to FIGS. 19-22, multiple views of the conductive assembly 50 are depicted. When used, the connector mounting sections 86 of the first and second heating blocks 66a, 66b, receive, and hold, the fiber optic connectors 64 provided in the connector load carrier 56 such that a portion of the ferrule 22 is positioned in the heating chamber 96 formed by the ferrule mounting section 88 of the first and second heating blocks 66a, 66b as shown in FIGS. 21-22.

The ferrule mounting sections 88 of the first and second heating blocks 66a, 66b together circumferentially surround a portion of the ferrule 22 to impart conductive heat directly into a portion of the ferrule 22. Any portion of the ferrule 22 can be positioned within the heating chamber 96. In certain examples, a tip of the ferrule 22 may be the only portion positioned in the heating chamber 96. The conductive heat accelerates the cure process of the adhesive to secure the first portion 36 of the optical fiber stub 24 within the ferrule bore 34 without imparting damage to plastic components of the fiber optic connector 64. Because the conductive heating is imparted through direct thermal contact with the ferrule 22, rapid curing results much faster than commonly used ovens or other heating sources that transmit heat. Any portion of the ferrule 22 can be in direct thermal contact with the heater device 52 such that no additional cap, insert, or other structure is utilized between the ferrule 22 and the heater device 52.

After the adhesive is cured, the fiber optic connectors 64 can be removed from the first and second heating blocks 66a, 66b by, for example, lifting the connector load carrier 56 from the receptacle 62. Next, the optical fiber 24 can be cleaved and the unpolished fiber end of the optical fiber 24 is polished. In certain examples, the polishing of the fiber end may be performed to a degree such that the resulting polished fiber end is flush with the end face 30 of the ferrule 22.

Polishing may be performed using, for example, polishing film and/or polishing paper. The end face 30 of the ferrule 22 with the unpolished fiber end may face the polishing film/paper, with the unpolished fiber end being in contact with the polishing film/paper, as the fiber-optic connector is moved along the polishing film/paper in sliding movements, until the fiber end is sufficiently polished. Those skilled in the art will recognize that other methods for polishing the fiber end may be used in addition or alternatively. Additional steps may be performed prior to polishing the fiber. The optical fiber 24 may, for example, be trimmed to shorten an excessively long optical fiber, prior to polishing.

In certain examples, the polishing also removes excessive adhesive, protruding beyond the end face 30 of the ferrule 22, in the area surrounding the fiber end. The polishing may, in addition, polish the end face 30 of the ferrule 22.

Controlling the temperature of the conductive assembly 50 may include cooling techniques, such as, natural cooling (e.g., passive cooling) or active cooling. Examples of active cooling can include a refrigeration source, cooling agent, or forced air convention, etc. In certain examples, temperature profile of the first and second heating blocks 66a, 66b can be altered during cure time. In certain examples, the first and second heating blocks 66a, 66b can be arranged and configured with a cooling apparatus (fluid or gas) to improve temperature control.

A technician may use the conductive assembly 50 to rapidly cure adhesive within the ferrule bore 34 to secure the optical fiber stub 24, by performing the following steps:

(a) mounting fiber optic connectors 64 into the connector mounting sections 86 of respective first and second heating blocks 66a, 66b of the heater device 52, thereby positioning a portion of the ferrule 22 of the fiber optic connector 64 in direct thermal contact with the heating chamber 96 defined by the longitudinal openings 94 in the ferrule mounting sections 88 of the first and second heating blocks 66a, 66b;

(b) applying a clamping force on the first and second heating blocks 66a, 66b when the first and second heating blocks 66a, 66b are mounted in the receptacle 62 to maintain substantial thermal contact about the ferrule 22; and (c) rapidly curing (for a duration of e.g., 10-60 sec) adhesive dispensed within the ferrule bore 34 to secure the optical fiber stub 24 therein.

For the step (c), the air cylinder clamps 58 can each be adjustably mounted on a support mount 142 (e.g., structure), which, in turn, can be fastened by bolts, welding, or otherwise suitably fastened, to the base plate 60.

Figure 23:
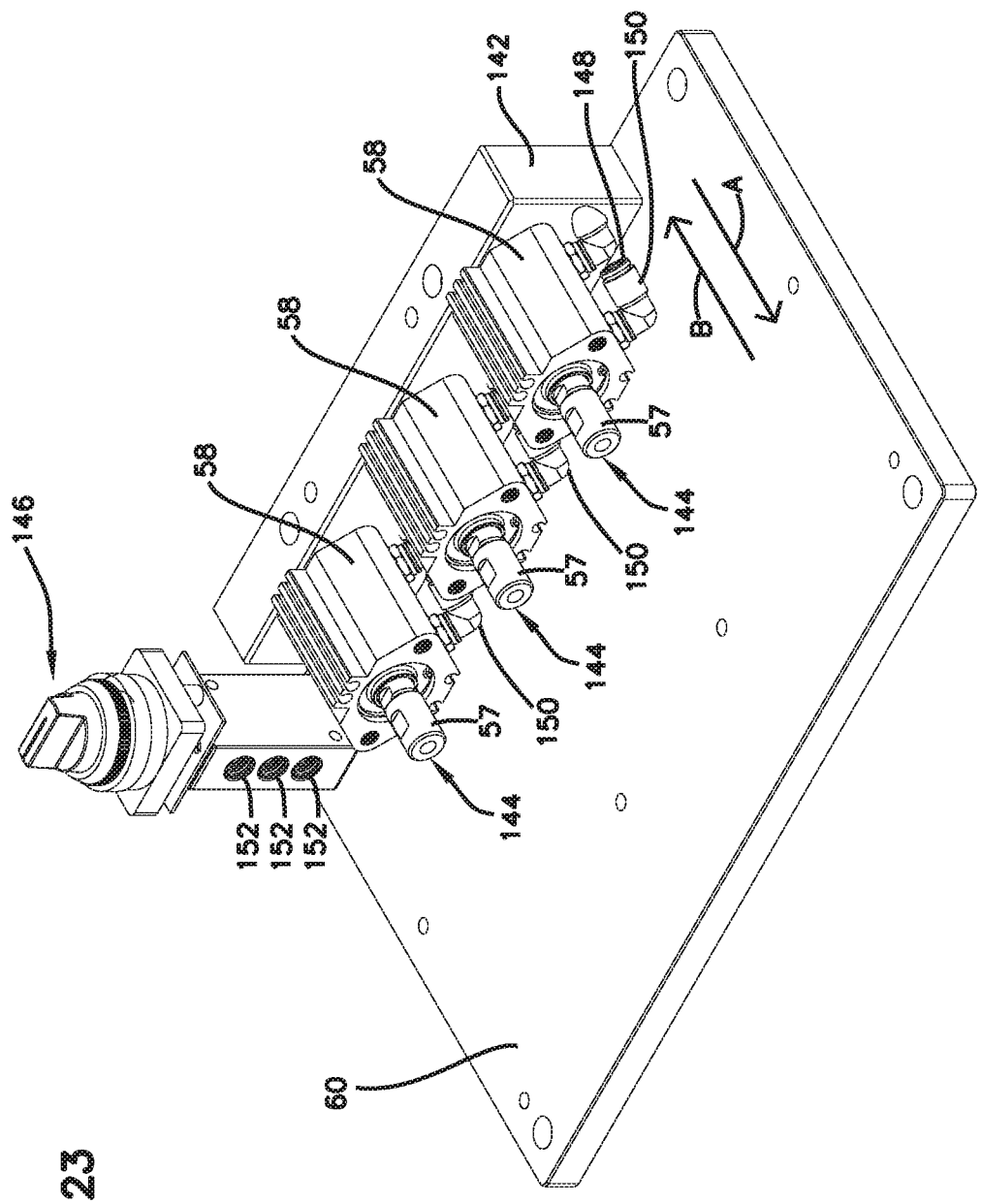
FIG. 23 is a perspective view of the conductive assembly of FIG. 7 showing air cylinder clamps in accordance with the principles of the present disclosure.

FIG. 23 shows the air cylinder clamps 58. Although three air cylinder clamps 58 are shown, any number of air cylinders clamps 58 may be used. The air cylinder clamps 58 remains horizontally level with respect to the heater device 52 to ensure accurate alignment and to ensure simultaneous operation of the linear actuators 57 to supply a sufficient clamping force. In certain examples, the linear actuators 57 are in the form of pneumatic actuators 144 that extend respectively from the air cylinder clamps 58 illustratively positioned opposite the second heating block 66b, although alternatives are possible.

The pneumatic actuators 144 can be configured to actuate linearly (e.g., slides back and forth in directions A and B) to engage the channel grooves 134 defined in the second side wall 126b of the first insulation plate 54a under fluid power (such as pressurized air). The pneumatic actuators 144 is able to apply a clamping force on the heater device 52, or more specifically, to the first and second heating blocks 66a, 66b, to cause the first and second heating blocks 66a, 66b to move closer together to provide substantial contact with the ferrule 22 within the heating chamber 96 so that thermally conductive heat can be more efficiently transferred to the ferrule 22. That power can be disconnected to release the clamping force on the first and second heating blocks 66a, 66b so that the first and second heating blocks 66a, 66b are in loose contact with each other. first insulation plate 54a. In other words, the pneumatic actuators 144 may hold the first and second heating blocks 66a, 66b pieces together. In other examples, the power may be electrical or hydraulic.

An air pressure regulator 146 (e.g., air switch, switch knob), having a pressure gauge, may be mounted on the base plate 60 to control pressurized air to the pneumatic actuators 144. It will be appreciated that air pressure from any source may be used, which may include an air compressor, a tank of compressed air, or other supply of pressurized air. The input pressure may be regulated in a manual mode by manually operating the air pressure regulator 146 or in an automatic mode. The air pressure regulator 146 can communicate with the pneumatic actuators 144 through passages 148 defined by conduits 150. The air pressure regulator 146 can define openings 152 for receiving supply lines or valves that communicate with the conduits 150. In certain examples, the openings 152 may include internal threads, although alternatives are possible.

Another aspect of the present disclosure relates generally to eliminating or at least reducing the amount of polishing that is required for ferrules of fiber optic connectors. A fiber optic connector can be designed to allow for rapid polishing by controlling the amount of adhesive that is displaced and accumulated in the region of the ferrule end face. The manufacturing of the fiber optic connector may be performed manually or in an automated manner, for example, if larger quantities of fiber-optic connectors are produced.

The manufacturing process of optical connectors typically consists of 8-15 steps generalized as: Fiber and Cable Preparation, Epoxy and Cure, Cleave, Epoxy Removal, Polish, and others. Arguably, the most performance-critical step in the manufacture of optical connectors lies in the geometry formation process (Cleaving through Polish). These steps greatly influence the fiber's physical contact between adjoining optical connectors and ultimately determine a connector's ability to transmit (optical signal power coupling loss) and reflect the transmission signal.

Polishing can be a multi-step process where the end-face of the ferrule and the fiber are gradually worked and reshaped using different grade polishing materials until the desired radius, angle, flatness and surface quality (roughness) is achieved. The number of polishing steps is connector dependent, ranging from 3 or 4 steps for simplex connectors, to 5 or 6 steps in multi-fiber connectors. Generally, polishing is time consuming, labor intensive and messy. In an effort to reduce manufacturing cycle time, reduce manufacturing complexity, and, ultimately remove manufacturing costs, it is desirable to reduce the time required for polishing a connector.

In certain examples, a laser can be used to process an end face of an optical fiber before the optical fiber is loaded into an adhesive filled ferrule bore within a ferrule. Characteristics of the laser (focal spot intensity, interaction time, wave length, pulse length) are selected so that the laser effectively rounds and shapes the end face and helps remove imperfections. In other embodiments, a plasma treatment or other energy source can be used to process the end face of the optical fiber.

Figure 24:
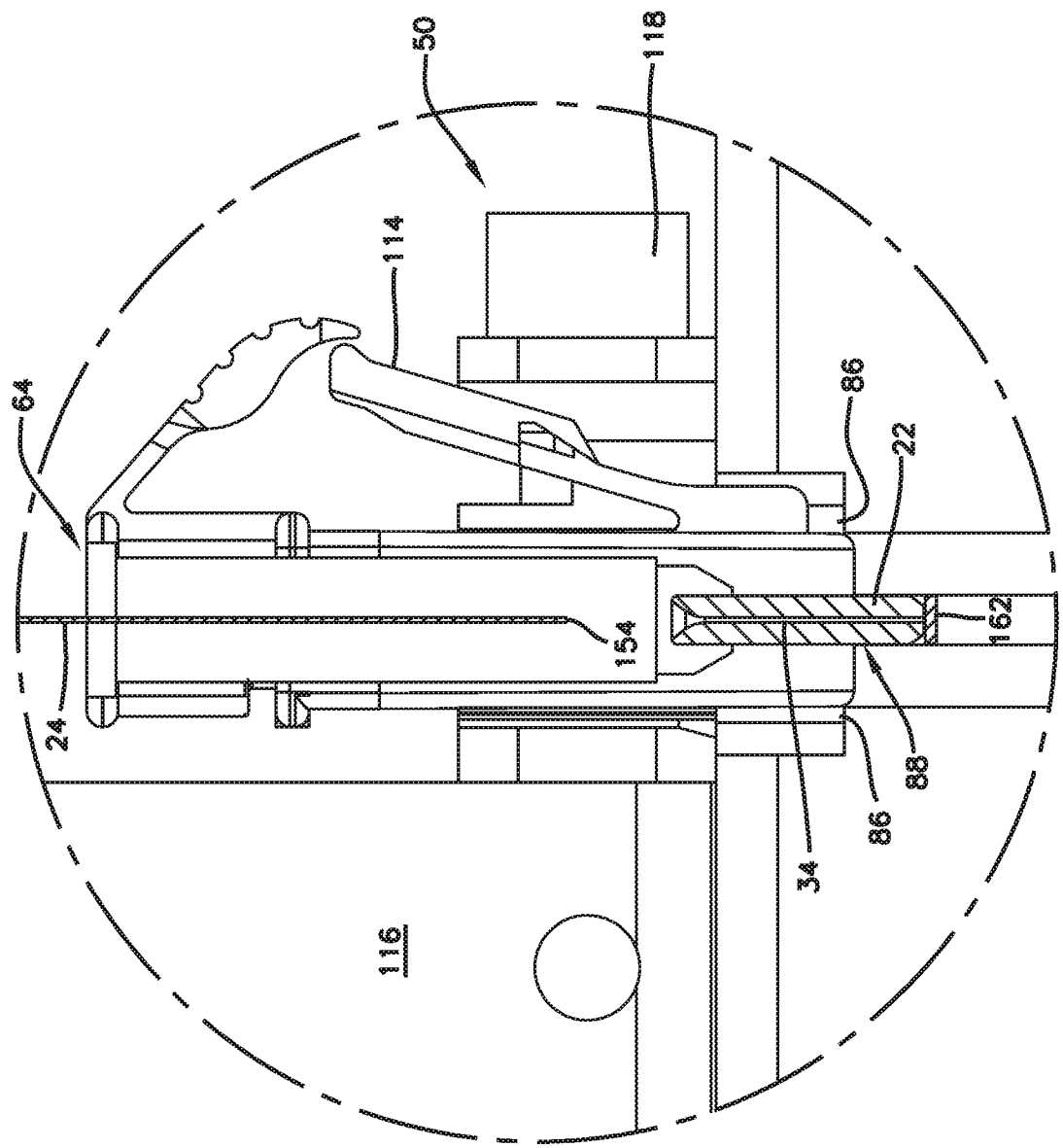
FIG. 24 is an enlarged cross-sectional view of a portion of the conductive assembly of FIG. 21 depicting a fiber optic connector mounted within an internal chamber of the heater device without the optical fiber therein and a pad positioned at a bottom of the internal chamber to create a stop for the ferrule of the fiber optic connector.

Referring to FIG. 24, the fiber optic connector 64 is shown positioned in the heater device 52 as described herein. Although the fiber optic connector 64 is shown positioned in the heater device 52, it will be appreciated that the fiber optic connector 64 can be positioned in an oven or other heating source.

The fiber optic connector 64 is shown prior to insertion of the optical fiber 24 into the ferrule 22. The optical fiber 24 is subsequently installed or inserted into the ferrule 22. The fiber optic connector 64 may also be designed to accommodate not only a single optical fiber, but multiple optical fibers, without departing from the disclosure herein.

Prior to inserting the optical fiber 24 within the ferrule bore 34, the method includes a first step of pre-processing (e.g., cleaving, etc.) an end face 154 (e.g., distal end face) of the optical fiber 24 before the optical fiber 24 is inserted into the ferrule bore 34 (e.g., fiber passage within the ferrule) with a bonding agent (e.g., adhesive, epoxy). In certain examples, the end face 154 may also be pre-polished (this rounds and shapes the end face and helps remove imperfections), although alternatives are possible. Thus, the optical fiber 24 can have a pre-processed end face before it is loaded into the ferrule 22. The preparation of the optical fiber 24 can be performed by a variety of methods. For example, a laser, plasma treatment, or other energy source may be used.

Cleaving an optical fiber refers to creating a mirror flat surface on the face of the optical fiber for efficient light coupling into the fiber. In certain examples, a pre-cleaved optical fiber may have a flat end face, although alternatives are possible. There are several techniques that can be employed in cleaving optical fibers.

Conventionally, cleaving is performed using a diamond blade to make a small crack on the surface of the optical fiber and then applying tension to the optical fiber to make this crack propagate. Mechanical cleavers are known in the art and may also be used, although alternatives are possible. Fiber end face cleaving can also be accomplished with precision using a laser cleaver, although alternatives are possible. These are only some examples, many other techniques may be used and will be apparent to one skilled in the art.

In some preferred embodiments, the optical fiber is only cleaved before insertion into the ferrule. No further cleaving is performed in these embodiments, following insertion of the fiber into the ferrule and curing of the adhesive. The ferrule end can be polished without a post-curing cleave in these preferred connectors and methods, saving time and reducing waste.

Figure 25:
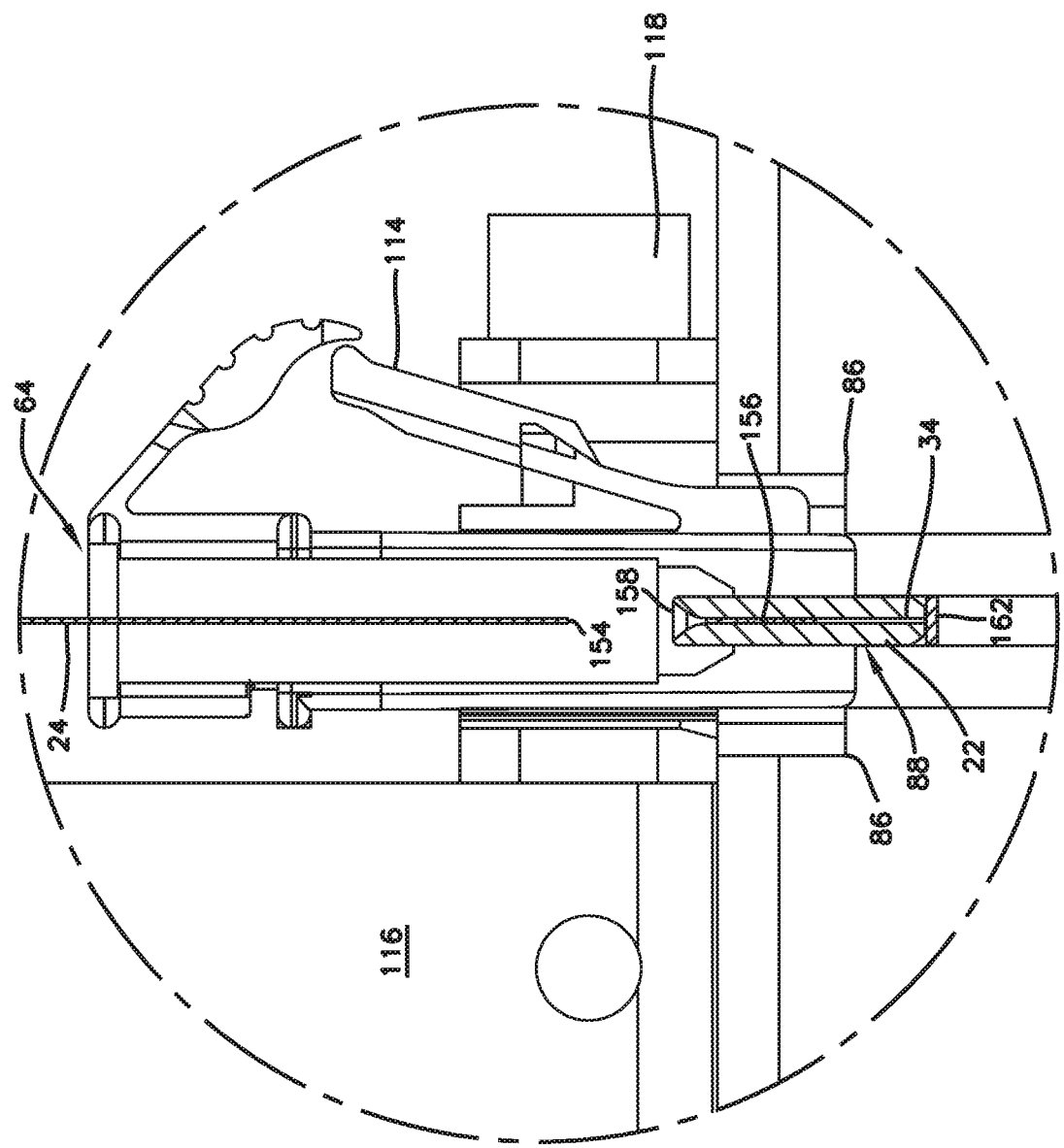
FIG. 25 is an enlarged cross-sectional view of a portion of the conductive assembly of FIG. 21 depicting an adhesive in the ferrule prior to the introduction of the optical fiber into the ferrule.

As shown at FIG. 25, adhesive 156 has been dispensed or injected into the ferrule bore 34 through a proximal end 158 of the ferrule 22. The adhesive 156 may be injected, for example, via a cannula or nozzle. The volume of adhesive 156 can be metered to ensure that the ferrule bore 34 does not fill. That is, the amount of adhesive 156 dispensed can be observed or monitored so that the adhesive 156 does not overfill, overflow, or run through the ferrule bore 34. As such, the dispensing of the adhesive can be controlled as desired and the amount of adhesive 156 that protrudes beyond the end face 30 of the ferrule 22 can be significantly reduced.

Figure 26:
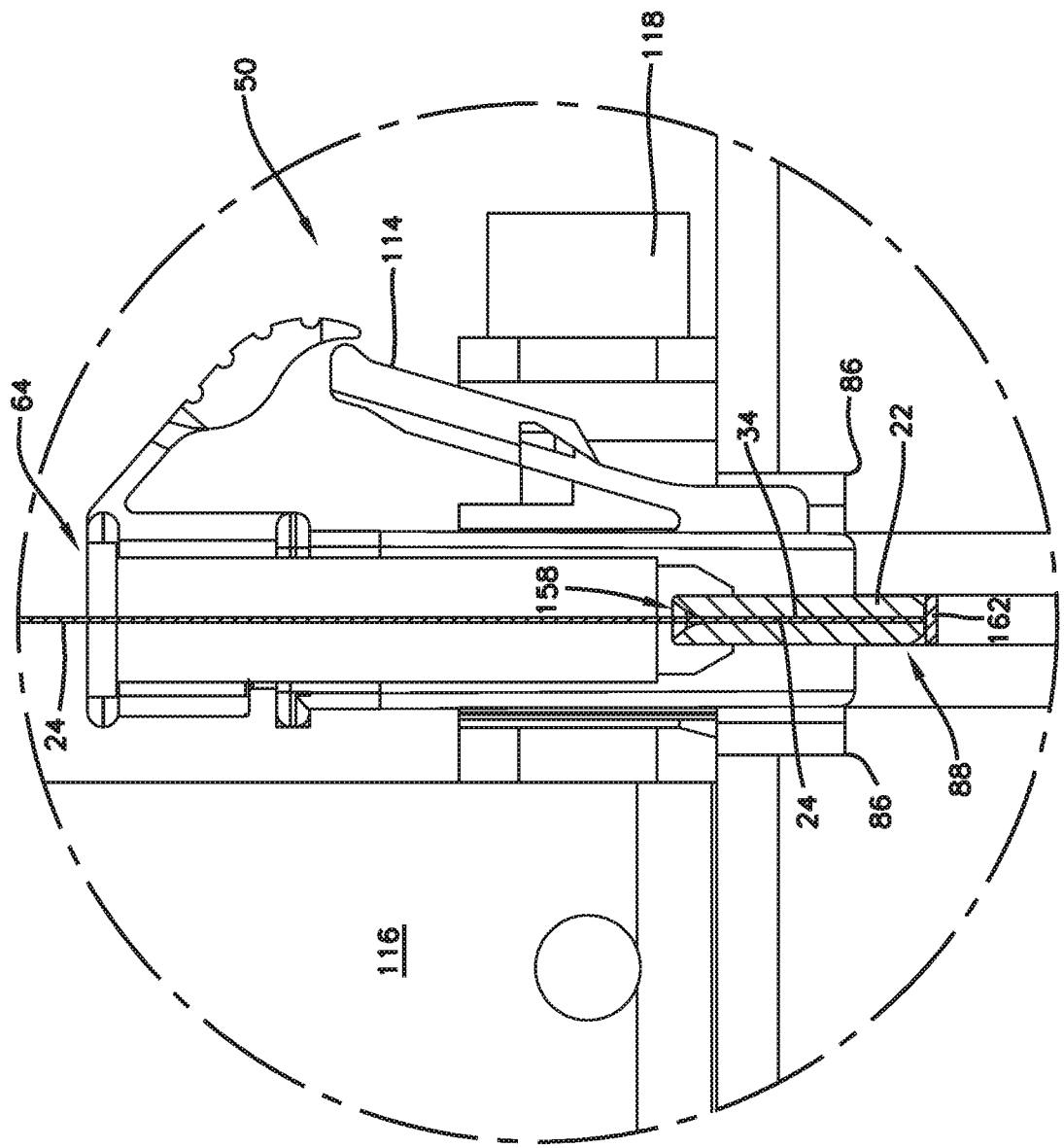
FIG. 26 is an enlarged cross-sectional view of a portion of the conductive assembly of FIG. 21 depicting the optical fiber within the ferrule.

As soon as the heater device 52 has reached a preset temperature (determinable via a temperature sensor or the like), the optical fiber 24 can be slowly introduced into the ferrule bore 34 through the proximal end 158 of the ferrule 22. The optical fiber 24 can be inserted into the ferrule bore 34 before the adhesive 156 has cured. FIG. 26 shows the optical fiber 24 with the pre-processed (i.e., cleaved) end face 154 inserted through the proximal end 158 of the ferrule 22 into the ferrule bore 34 partially filled with the adhesive 156. The fiber may be fed through the ferrule bore 34 of the ferrule to protrude beyond the end face 30 of the ferrule 22.

Figure 27:
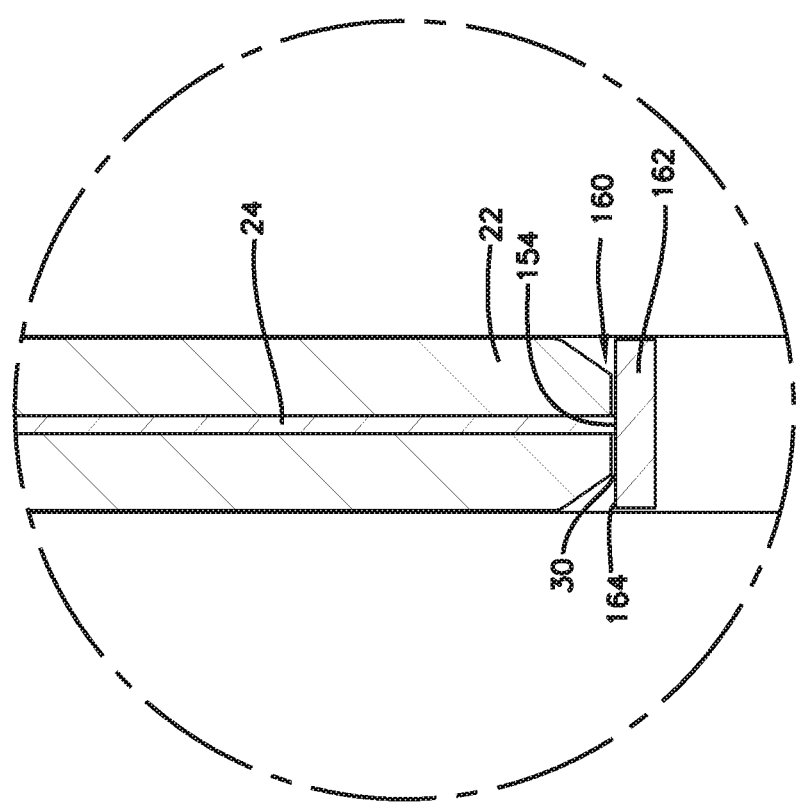
FIG. 27 is an enlarged cross-sectional view of a portion of the conductive assembly of FIG. 21 depicting the pad precisely positioning the optical fiber just past an end face of the ferrule in accordance with the principles of the present disclosure.

FIG. 27 shows the optical fiber 24 positioned within the ferrule bore 34 such that the pre-processed end face 154 of the optical fiber 24 is located at a pre-determined axial position relative to a distal end 160 of the ferrule 22. In certain examples, the optical fiber 24 can extend at least about 50 microns from the end face 30 of the ferrule, although alternatives are possible. Due to the insertion of the optical fiber 24 into the ferrule bore 34, a volume of adhesive 156 may be displaced and may accumulate in the region of the end face 30 of the ferrule 22. That is, the adhesive 156 within the ferrule bore 34 can be pushed out with the optical fiber 24 such that a small portion of the adhesive 156 exits the front end 26 or distal end 160 of the ferrule 22 along with the pre-processed end face 154 of the optical fiber 24. One advantage of metering the adhesive is that it results in a reduction of the amount of adhesive that would normally accumulate on an end face of a ferrule when an optical fiber is passed therethrough. As such, a rapid polishing process can be achieved due to the reduced amount of adhesive having to be removed.

In certain examples, a pad 162 (e.g., plate, block, sheet, film) that has a flattened surface 164 can be positioned in a bottom portion of the heating chamber 96 that is formed by the first and second heating blocks 66a, 66b. Although the pad 162 is shown mounted in the heater device 52, it will be appreciated that the pad 162 and the heater device 52 can be used independently. For example, the pad 162 can be used in conjunction with in a convection type heating source, such as an oven or other heating source. The pad 162 can comprise rubber or plastic material, although alternatives are possible. In certain examples, the pad 162 comprises silicon rubber or polytetrafluoroethylene (PTFE) e.g. TEFLON™, Teflon. It will be appreciated that other elastomeric materials may be used. In certain examples, the pad 162 is removable, although alternatives are possible.

The pad 162 can be arranged and configured to create a positive stop for the ferrule 22 when the fiber optic connector 64 is inserted within the heater device 52. That is, a nose portion 166 of the ferrule 22 can be positioned to kiss against the flattened surface 164 of the pad 162 when the ferrule 22 is fully inserted within the ferrule mounting section 88.

The pad 162 can also be arranged and configured to precisely position the optical fiber 24 just past the end face 30 of the ferrule 22 when the optical fiber 24 is inserted therein. The position of the optical fiber 24 relative to the end face 30 of the ferrule 22 can vary as desired. In certain examples, the optical fiber 24 can extend about 50 microns from the end face 30 of the ferrule 22, although alternatives are possible.

Referring to FIG. 28, adhesive 156 that exits the distal end 160 of the ferrule 22 along with the optical fiber 24 can flow onto the flattened surface 164 of the pad 162. When the adhesive 156 contacts the pad 162, the adhesive 156 can spread across the end face 30 of the ferrule 22 and flatten out to form a thin film layer 168 thereon. Once cured, the thin film layer 168 can be removed easily and faster in a subsequent polishing step. Having a thin film layer 168 results in less adhesive being removed from the end face 30, which in comparison eliminates or at least reduces the traditional grinding away of large amounts of adhesive or blobs of adhesive during the polish process.

As described herein, the adhesive 156 can be cured by conductive heating provided by the heater device 52 of the conductive assembly 50, which secures the optical fiber 24 within the ferrule bore 34 such that the pre-processed end face 154 of the optical fiber 24 is fixed at the pre-determined axial position relative to the distal end 160 of the ferrule 22. In certain examples, only a few seconds after the optical fiber 24 has been introduced, the fiber optic connector 64 can be removed from the heater device 52. The fiber optic connectors 64 can be removed from the conductive assembly 50 and the subsequent polishing process can be performed. In certain examples, the optical fiber 24 can be polished flush with the end face 30 of the ferrule 22. In certain examples, the pre-processed end face 154 of the optical fiber 24 can be fixed by curing the adhesive in a convection type heating system that includes the pad 162.

From the forgoing detailed description, it will be evident that modifications and variations can be made without departing from the spirit and scope of the disclosure.

What is claimed is:

1. A conductive heating assembly for securing an optical fiber to a ferrule of a fiber optic connector, the conductive heating assembly comprising:
   a heater device including intermating first and second heating blocks, the first and second heating blocks each having a ferrule mounting section defining longitudinal slots with half-cylindrical interfaces;
   a connector load carrier configured to hold the fiber optic connector in relationship to the first and second heating blocks such that when the connector load carrier is removably coupled to the heater device, the connector load carrier vertically inserts a portion of the ferrule into a heating chamber of the heater device such that the half-cylindrical interfaces of the ferrule mounting section of the first and second heating blocks extend within a main connector body of the fiber optic connector;
   the first and second heating blocks cooperating together such that the half-cylindrical interfaces of the longitudinal slots define the heating chamber, which is adapted to receive the portion of the ferrule;
   wherein heat is conducted via the first and second heating blocks directly to the portion of the ferrule when mounted in the heating chamber to rapidly cure adhesive in the ferrule.

2. The conductive heating assembly of claim 1, further comprising at least one heating element embedded in an opening defined in the heater device.

3. The conductive heating assembly of claim 1, further comprising insulation plates that are in thermal conductive contact with the heater device to insulate the heat generated by the heater device.

4. The conductive heating assembly of claim 1, wherein the connector load carrier has at least one connector opening and the fiber optic connector is connected within the at least one connector opening by a snap-fit connection.

5. The conductive heating assembly of claim 1, wherein when the connector load carrier is coupled with the first and second heating blocks, the main connector body of the fiber optic connector does not directly contact the first and second heating blocks such that the main connector body is protected from thermal distortion or damage.

6. The conductive heating assembly of claim 1, wherein a clamping force is providing on at least one of the first and second heating blocks to maintain the portion of the ferrule in operative relationship with the heater device.

7. The conductive heating assembly of claim 1, wherein the first and second heating blocks include retaining structures adapted to receive the main connector body.

8. The conductive heating assembly of claim 7, further comprising a pad positioned at a bottom portion of the heating chamber, wherein, when the main connector body is mounted in one of the retaining structures, the pad creates a positive stop for the ferrule and precisely positions a cleaved optical fiber past an end face of the ferrule.

9. The conductive heating assembly of claim 8, wherein adhesive that hits the pad flattens out to create a thin adhesive layer across the end face of the ferrule that is easily removed in a polishing process.

* * * * *